United States Patent

Griggs, Jr. et al.

[15] 3,643,077

[45] Feb. 15, 1972

[54] ELECTRONIC PRINTING DIGITAL CALCULATOR

[72] Inventors: John O. Griggs, Jr.; Arthur J. Radcliffe, Jr., both of Plymouth; Michael F. Matouka, Sterling Heights, all of Mich.

[73] Assignee: Burroughs Corporation, Detroit, Mich.

[22] Filed: Mar. 13, 1970

[21] Appl. No.: 19,236

[52] U.S. Cl. ............................................235/160, 235/168

[51] Int. Cl. ......................................................G06f 7/385

[58] Field of Search.................235/156, 159, 160, 168, 176, 235/92 CP, 92 DN, 92 BD; 340/146.1

[56] References Cited

UNITED STATES PATENTS

| | | | |
|---|---|---|---|
| 2,995,298 | 8/1961 | Elmore et al. | 235/92 |
| 3,246,292 | 4/1966 | Way Dong Woo | 340/146.1 |
| 2,915,966 | 12/1959 | Jacoby | 101/93 X |
| 3,159,740 | 12/1964 | Broce | 235/176 X |
| 3,426,185 | 2/1969 | Cox et al. | 235/176 |
| 3,353,008 | 11/1967 | Kitz et al. | 235/160 |
| 3,513,303 | 5/1970 | Kitz et al. | 235/160 |
| 3,541,316 | 11/1970 | Drage | 235/160 |

*Primary Examiner*—Charles E. Atkinson
*Attorney*—Kenneth L. Miller and Charles S. Hall

[57] ABSTRACT

A printing electronic digital calculator having a system for translating instructions and decimal data into binary data, a register for receiving and temporarily storing the binary data, a memory with a plurality of registers, a single arithmetic register for transferring data from said receiving register to a memory register, for transferring data from one register of the memory to another register of the memory, for storing and algebraically increasing a factor according to a value stored in a register of the memory, all under the control of logic stored in the calculator, and for counting synchronizing pulses from a printing system to enable alignment of the proper character in the printer to be printed. A pair of registers in the memory may be treated as a single entry register with individually addressable word locations. A word-change system for this pair of registers transposes the logical designation of the two words, obviating the necessity for a physical transfer of a factor from one word location to the other in operations of the calculator.

42 Claims, 30 Drawing Figures

INVENTORS
JOHN O. GRIGGS
BY ARTHUR J. RADCLIFFE
MICHAEL F. MATOUKA

ATTORNEY

FIG. 3

| KEY MARKING | CODING | LOGIC TERM |
|---|---|---|
| 00 | 8-2 | DZ |
| • | 8-2-1 | DP |
| $=^{-}$ | 16-2 | EQSU |
| − | 16-2-1 | SU! |
| ✱ | 16-4-1 | TOT |
| + | 16-4-2 | ADI |
| $=^{+}$ | 16-4-2-1 | EQAD |
| X | 16-8 | ENTMU |
| = | 16-8-1 | MUEQ |
| ÷ | 16-8-2 | ENTDV |
| ≑ | 16-8-4-1 | DVEQ |
| ◇ | 16-8-4-2 | SUBTOT |
| C | 16-8-4-2-1 | CL |
| 0 | NONE SET | |
| 1 | 1 | |
| 2 | 2 | |
| 3 | 2-1 | |
| 4 | 4 | |
| 5 | 4-1 | |
| 6 | 4-2 | |
| 7 | 4-2-1 | |
| 8 | 8 | |
| 9 | 8-1 | |

FIG. 7

LISTING START LOGIC

INITIAL CONDITIONS = (IDLE+LOAD), $\overline{CLKF}$, $\overline{ALARMF}$

L1 [IR<10+DP+DZ]·(IDLE+LOAD)·$\overline{CLKF}$·$\overline{ALARMF}$·[$\overline{(IR=DP)}$·COMPF] ⇒ (SET CLKF)
L2 [IR<10+DP+DZ]· IDLE·CLKF·ALARMF ⇒ (COMP AKF)

CLEAR WORD K
L3 [IR<10+DP+DZ]·IDLE·CLKF ⇒ (0 TO MEM), (DD UP)
L4 [IR<10+DP+DZ]·IDLE·CLKF·(DD=15) ⇒ (SET LOAD)

INTEGER
L5 [IR<10+DZ]·[LOAD·CLKF]·$\overline{COMPF}$ ⇒ (SET SHIFT, SET CLKF, RST CYF), (15 TO DD)
L6 (IR=DZ)·[LOAD·CLKF]·$\overline{COMPF}$ ⇒ (AR UP)

DECIMAL POINT ($\overline{AUTO}$)
L7 (IR=DP)·[LOAD·CLKF]·$\overline{AUTO}$ ⇒ (SET COMPF), (DS+1 TO DD), (RST CLKF)

DECIMAL POINT (AUTO)
L8 [IR=DP] [LOAD·CLKF]·$\overline{COMPF}$·AUTO ⇒ (DS-R+1 TO DD), (DS+1 TO AR), (SET COMPF)
L9 [IR=DP]·[LOAD·CLKF]·COMPF·AUTO·($\overline{L10}$)·($\overline{L11}$) ⇒ (DD DN), (AR DN)
L10 [IR=DP]·[LOAD·CLKF]·COMPF·AUTO·(DD=0)·(AR=0) ⇒ (DS-R+1 TO DD), (RST CLKF)
L11 [IR=DP]·[LOAD·CLKF]·COMPF·AUTO·(DD=0)·($\overline{L10}$) ⇒ (AR DN), (15 TO DD), (SET SHIFT, SET CLKF, RST CYF)

NUMBERS
L12 [IR<10+DZ]·[LOAD CLKF]·COMPF·(DD=0) ⇒ (LSTEC, RST CLKF)
L13 [IR<10+DZ]·[LOAD CLKF]·COMPF·$\overline{CR2F}$·$\overline{CR1F}$ ⇒ (IR TO AR), (DD DN)
L14 [IR<10]·[LOAD CLKF]·COMPF·($\overline{L13}$) ⇒ (AR TO MEM), (RST CLKF)
L15 [IR=DZ]·[LOAD CLKF]·COMPF·($\overline{L13}$) ⇒ (DD DN), (RST CLKF)

LEGEND

| LOGIC FUNCTION | SYMBOL |
|---|---|
| AND | · |
| OR | + |
| NOT | — |
| = | = |
| RESULT | ⇒ |

FIG. 8

LISTING SHIFT LOGIC

INITIAL CONDITIONS = CLKF, $\overline{CR1F}$, $\overline{CR2F}$, DD=15, $\overline{TBF}$

CR0 COUNT

LS1 [IR<10+DP+DZ]·[SHIFT]·($\overline{CR2F}$·$\overline{CR1F}$)·($\overline{DD=15}$) ⇒ (MEM to AR)

LS2 [IR<10+DP+DZ]·[SHIFT]·($\overline{CR2F}$·$\overline{CR1F}$)·(DD=15)·($\overline{MEM=0}$) ⇒ (LSTEC, RST CLKF), (SET LOAD)

CR1 COUNT

LS3 [IR<10+DP+DZ]·[SHIFT]·($\overline{CR2F}$·CR1F) ⇒ (0 to MEM), (DD UP)

LS4 [IR<10+DP+DZ]·[SHIFT]·($\overline{CR2F}$·CR1F)·(AR=0)·(DD=0) ⇒ (SET TBF)

CR2 COUNT

LS5 [IR<10+DP+DZ]·[SHIFT]·(CR2F·$\overline{CR1F}$)·($\overline{DD=1}$) ⇒ (AR to MEM)

LS6 [IR<10+DP+DZ]·[SHIFT]·(CR2F·$\overline{CR1F}$)·$\overline{TBF}$ ⇒ (DD DN)

LS7 [IR=DP]·[SHIFT]·(CR2F·$\overline{CR1F}$)·TBF ⇒ (DS+1 to DD)

LS8 [IR<10 + DZ]·[SHIFT]·(CR2F·$\overline{CR1F}$)·TBF·$\overline{AUTO}$ ⇒ (IR to AR), (DS+1 to DD)

LS9 [IR<10 + DZ]·[SHIFT]·(CR2F·$\overline{CR1F}$)·TBF·AUTO ⇒ (IR to AR), (DS-R+1 to DD)

CR3 COUNT

LS10 [IR<10+DP+DZ]·[SHIFT]·(CR2F·CR1F)·$\overline{TBF}$ ⇒ (DDDN)

LS11 [IR<10+DP+DZ]·[SHIFT]·(CR2F·CR1F)·$\overline{TBF}$·(DD=0) ⇒ (ARDN)

LS12 [IR<10]·[SHIFT]·(CR2F·CR1F)·TBF ⇒ (AR to MEM)

LS13 [IR<10+DP+DZ]·[SHIFT]·(CR2F·CR1F)·TBF ⇒ (SET LOAD), (RST CLKF)

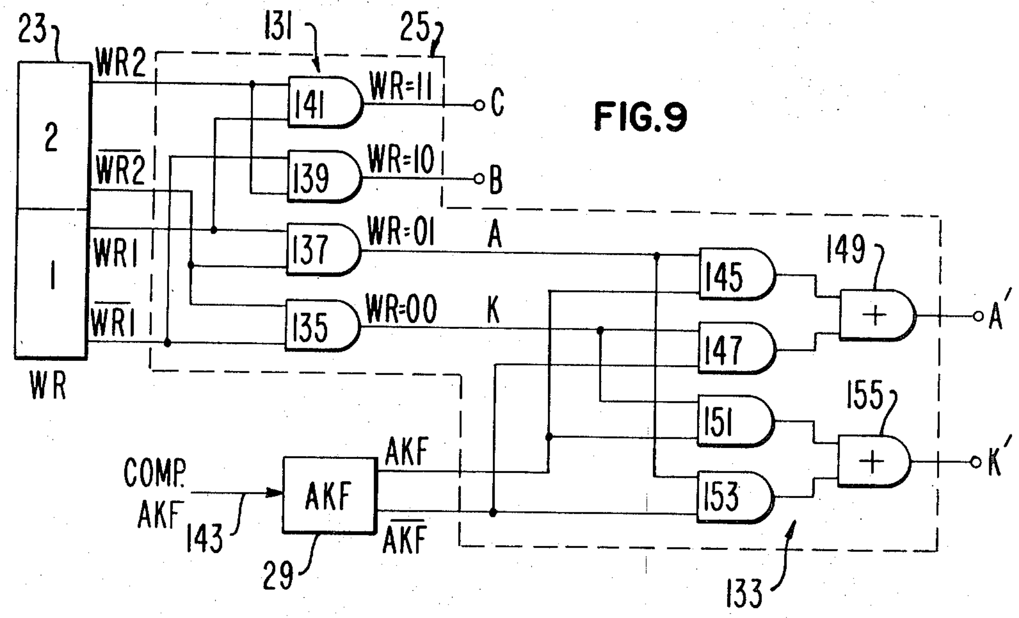
FIG.9
FIG.10
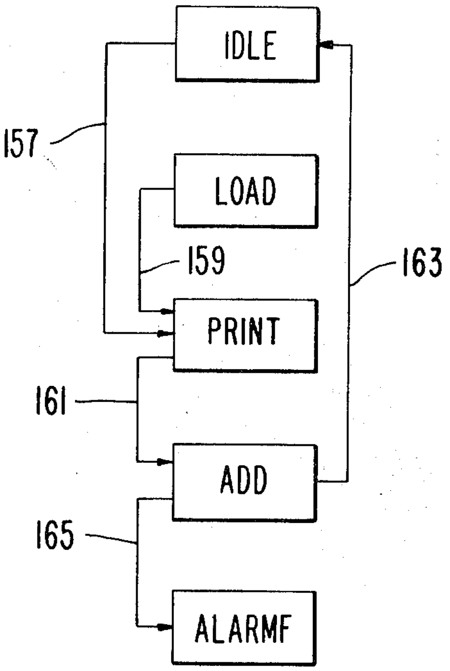
FIG.9A
| A | K | AKF | A′ | K′ |
|---|---|---|---|---|
| 1 | 0 | 1 | 1 | 0 |
| 1 | 0 | 0 | 0 | 1 |
| 0 | 1 | 1 | 0 | 1 |
| 0 | 1 | 0 | 1 | 0 |

FIG. 11

ADD & SUBTRACT START LOGIC

INITIAL CONDITIONS = (IDLE+LOAD), $\overline{CLKF}$, $\overline{ALARMF}$, (AD+SU)

AS 1 (AD+SU)·(IDLE+LOAD)·$\overline{CLKF}$·$\overline{ALARMF}$ ⇒ (SET PRINT, SET CLKF, 0 TO CR, 15 TO DD, RST CYF, SET COMPF)

AS 2 (AD+SU)·END OF PRINT ⇒ (SET B), (SET ADD, SET CLKF, 0 TO CR, RST CYF)

AS 3 AD = EQAD + AD1

AS 4 SU = EQSU + SU1

FIG. 12

ADD & SUBTRACT LOGIC

INITIAL CONDITIONS = DD=0, CR=0, WORD B, CLKF, $\overline{DPF}$, $\overline{CYF}$, $\overline{COMPF}$ A 1 [(AD+SU)·ADD·(CR=0)]·$\overline{DPF}$ ⇒ (MEM TO AR), (SET K)
A 2 [(AD+SU)·ADD·(CR=0)]·DPF ⇒ (0 TO AR)

A 3 [(AD+SU)·ADD·(CR=1)]·CYF COMPF ⇒ (AR DN)
A 4 [(AD+SU)·ADD·(CR=1)]·CYF COMPF·($\overline{AR=0}$) ⇒ (RST CYF)
A 5 [(AD+SU)·ADD·(CR=1)]·CYF $\overline{COMPF}$ ⇒ (AR UP)
A 6 [(AD+SU)·ADD·(CR=1)]·CYF $\overline{COMPF}$·($\overline{AR=9}$) ⇒ (RST CYF)

A 7 [(AD+SU)·ADD·MEMSCAN L]·($\overline{DD=0}$)·COMPF ⇒ (AR DN)
A 8 [(AD+SU)·ADD·MEMSCAN L]·($\overline{DD=0}$)·$\overline{COMPF}$ ⇒ (AR UP)

A 9 [(AD+SU)·ADD·(CR=13)] ⇒ (SET B)
A10 [(AD+SU)·ADD·(CR=13)]·DPF (DD=0) (MEM=0) ⇒ (AR UP)
A11 [(AD+SU)·ADD·(CR=13)]·DPF (DD=15) ⇒ (RST CYF)
A12 [AD·ADD·(CR=13)] · (DD=0)·(AR=1) ⇒ (SET COMPF)
A13 [SU·ADD·(CR=13)] · (DD=0)·(AR=0) ⇒ (SET COMPF)

A14 [(AD+SU)·ADD·(CR=14)] ⇒ (0 TO MEM)

A15 [(AD+SU)·ADD·(CR=15)] ⇒ (AR TO MEM), (DD UP)
A16 [(AD+SU)·ADD·(CR=15)]·(DD=15) ⇒ (RST CYF), (SET DPF)
A17 [(AD+SU)·ADD·(CR=15)]·(DD=15)·CYF·$\overline{COMPF}$ ⇒ (COMPEC, RST CLKF)
A18 [(AD+SU)·ADD·(CR=15)]·(DD=15)·$\overline{CYF}$ ⇒ (SET IDLE, RST CLKF)

FIG. 12A

CT1 (AR UP)·(AR=9) ⇒ SET CYF, 0 TO AR

CT2 (AR DN)·(AR=0) ⇒ SET CYF, 9 TO AR

FIG. 16

CLEAR START LOGIC

CL1 LSTEC ⇒ SET ALARMF, RST CLKF

CL2 COMPEC ⇒ SET ALARMF, RST CLKF, SET ECPF

CL3 ALARMF ⇒ TURN ON ALARM LIGHT

CL4 $CL\cdot\overline{ECPF}$ ⇒ SET IDLE, RST CLKF, RST ALARMF

CL5 CL·LOAD ⇒ COMP. AKF

CL6 $CL\cdot ECPF\cdot\overline{PRINT}$ ⇒ SET PRINT, SET CLKF, 0 TO CR, 15 TO DD, RST CYF, SET COMPF

CL7 CL·(END OF PRINT) ⇒ SET IDLE, RST CLKF, RST ALARMF RST ECPF, COMP. AKF

FIG. 28

$$
\begin{aligned}
S1 = {} & (AR=0)\cdot AD\cdot K + (AR=1)\cdot SU\cdot K \\
& + (AR=2)\cdot SUBTOT\cdot(MEM=0) + (AR=4)\cdot SUBTOT\cdot(MEM\neq 0) \\
& + (AR=5)\cdot TOT\cdot(MEM=0) + (AR=6)\cdot TOT\cdot(MEM\neq 0) \\
& + (AR=7)\cdot(MUEQ+DVEQ)\cdot K
\end{aligned}
$$

$$
\begin{aligned}
S2 = {} & (AR=1)\cdot[(AD+SU)+(TOT+SUBTOT)+(ENTMU+ENTDV)] \\
& + (AR=4)\cdot MU\cdot\overline{K} + (AR=5)\cdot DV\cdot\overline{K} \\
& + (AR=7)\cdot(MU+DV)\cdot K + (AR=9)\cdot CL
\end{aligned}
$$

LEGEND

MU = MUEQ+EQAD+EQSU

DV = DVEQ+EQAD+EQSU

FIG. 18

TOTAL & SUBTOTAL START LOGIC

INITIAL CONDITIONS = (IDLE+LOAD), $\overline{\text{CLKF}}$, $\overline{\text{ALARMF}}$, (TOT+SUBTOT)

T1 (TOT+SUBTOT)·(IDLE+LOAD)·$\overline{\text{CLKF}}$·$\overline{\text{ALARMF}}$ ⇒ (SET B), (SET PRINT, SET CLKF, O TO CR, 15 TO DD, RST CYF, SET COMPF)

T2 (TOT+SUBTOT)·(END OF PRINT) ⇒ (SET MOVE, SET CLKF, O TO CR, O TO DD)

T3 (TOT+SUBTOTAL)·(END OF MOVE) ⇒ (SET IDLE, RST CLKF)

FIG. 19

MOVE LOGIC

CR0 count

M1 [MOVE·$\overline{\text{CR2F}}$·$\overline{\text{CR1F}}$] ⇒ (MEM TO AR)

CR1 count

M2 TOT [MOVE·$\overline{\text{CR2F}}$·CR1F] ⇒ (O TO MEM)

M3 [MOVE·$\overline{\text{CR2F}}$·CR1F] ⇒ (SET K)

CR2 count

M4 [MOVE·CR2F·$\overline{\text{CR1F}}$] ⇒ (O TO MEM)

CR3 count

M5 [MOVE·CR2F·CR1F] · ($\overline{\text{DD=0}}$) ⇒ (AR TO MEM)

M6 [MOVE·CR2F·CR1F] · ($\overline{\text{DD=15}}$) ⇒ (SET B) (DD UP)

M7 [MOVE·CR2F·CR1F] · (DD=15) ⇒ (END OF MOVE)

$a \times b = ab$

| | $K_4$ | $K_3$ | $K_2$ | $K_1$ | $A_4$ | $A_3$ | $A_2$ | $A_1$ | $A_0$ | $C_4$ $C_3$ $C_2$ $C_1$ | STEP No. |
|---|---|---|---|---|---|---|---|---|---|---|---|
| | 0 | 0 | 0 | 0 | 0 | 0 | 3 | 2 | 4 | 0 1 2 6 | |
| +126 | 0 | 1 | 2 | 6 | 0 | 0 | 3 | 1 | 4 | | 1 |
| +126 | 0 | 2 | 5 | 2 | 0 | 0 | 3 | 0 | 4 | | 2 |
| SHIFT RIGHT | 0 | 0 | 2 | 5 | 2 | 0 | 0 | 3 | 3 | | 3 |
| +126 | 0 | 1 | 5 | 1 | 2 | 0 | 0 | 2 | 3 | | 4 |
| +126 | 0 | 2 | 7 | 7 | 2 | 0 | 0 | 1 | 3 | | 5 |
| +126 | 0 | 4 | 0 | 3 | 2 | 0 | 0 | 0 | 3 | | 6 |
| SHIFT RIGHT | 0 | 0 | 4 | 0 | 3 | 2 | 0 | 0 | 2 | | 7 |
| SHIFT RIGHT | 0 | 0 | 0 | 4 | 0 | 3 | 2 | 0 | 1 | | 8 |
| SHIFT RIGHT | 0 | 0 | 0 | 0 | 4 | 0 | 3 | 2 | 0 | | 9 |

FIG. 22

$a \div b = a/b$

| | K | A | C | |
|---|---|---|---|---|
| | – | – | – | |
| INDEX a | a | – | – | COMP. AKF |
| ENTDV KEY (÷) | a | – | a | MOVE K→C |
| | a | – | a | PRINT C |
| INDEX b | b | a | a | COMP. AKF |
| DVEQ KEY (⩦) | o | a | b | MOVE K→C (CLEAR K) |
| | o | a | b | PRINT C |
| | R | a/b | b | DIVIDE |
| | a/b | R | b | COMP. AKF |
| | a/b | R | b | PRINT K |

FIG. 23

| | $K_4$ | $K_3$ | $K_2$ | $K_1$ | $A_4$ | $A_3$ | $A_2$ | $A_1$ | $A_0$ | $C_4$ | $C_3$ | $C_2$ | $C_1$ | STEP No. |
|---|---|---|---|---|---|---|---|---|---|---|---|---|---|---|
| | 0 | 0 | 0 | 0 | 0 | 6 | 7 | 4 | 4 | 0 | 0 | 5 | 6 | |
| −56 | 9 | 9 | 4 | 4 | 0 | 6 | 7 | 4 | 4 | | | | | 1 |
| +56 | 0 | 0 | 0 | 0 | 0 | 6 | 7 | 4 | 4 | | | | | 2 |
| SHIFT LEFT | 0 | 0 | 0 | 0 | 6 | 7 | 4 | 0 | 3 | | | | | 3 |
| −56 | 9 | 9 | 4 | 4 | 6 | 7 | 4 | 0 | 3 | | | | | 4 |
| +56 | 0 | 0 | 0 | 0 | 6 | 7 | 4 | 0 | 3 | | | | | 5 |
| SHIFT LEFT | 0 | 0 | 0 | 6 | 7 | 4 | 0 | 0 | 2 | | | | | 6 |
| −56 | 9 | 9 | 5 | 0 | 0 | 0 | 0 | 0 | 2 | | | | | 7 |
| +56 | 0 | 0 | 0 | 6 | 7 | 4 | 0 | 0 | 2 | | | | | 8 |
| SHIFT LEFT | 0 | 0 | 6 | 7 | 4 | 0 | 0 | 0 | 1 | | | | | 9 |
| −56 | 0 | 0 | 1 | 1 | 4 | 0 | 0 | 1 | 1 | | | | | 10 |
| −56 | 9 | 9 | 5 | 5 | 4 | 0 | 0 | 1 | 1 | | | | | 11 |
| +56 | 0 | 0 | 1 | 1 | 4 | 0 | 0 | 1 | 1 | | | | | 12 |
| SHIFT LEFT | 0 | 1 | 1 | 4 | 0 | 0 | 1 | 0 | 0 | | | | | 13 |
| −56 | 0 | 0 | 5 | 8 | 0 | 0 | 1 | 1 | 0 | | | | | 14 |
| −56 | 0 | 0 | 0 | 2 | 0 | 0 | 1 | 2 | 0 | | | | | 15 |
| −56 | 9 | 9 | 4 | 6 | 0 | 0 | 1 | 2 | 0 | | | | | 16 |
| +56 | 0 | 0 | 0 | 2 | 0 | 0 | 1 | 2 | 0 | | | | | 17 |

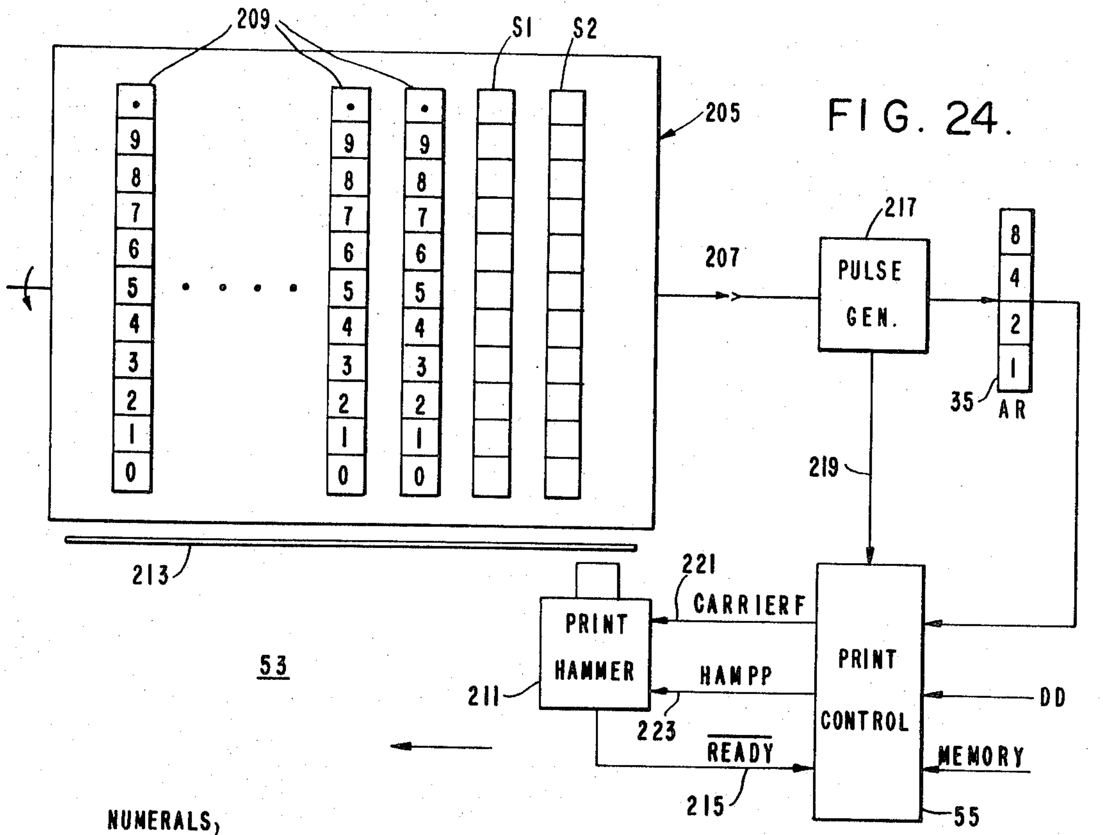

FIG. 24.

| AR | NUMERALS | S1 | S2 | KEY INDEXED | MEMORY |
|---|---|---|---|---|---|
| (AR=0)·$\overline{CYF}$ | 0 | + | | AD (67) | K |
| (AR=1)·$\overline{CYF}$ | 1 | − | | SU (69) | K |
| | | | < | AD (67)+SU(69)+TOT(78)+SUBTOT(79)+ENTMU(74)+ENTDV(76) | |
| (AR=2)·$\overline{CYF}$ | 2 | ◇ | | SUBTOT (79) | MEM=0 |
| (AR=3)·$\overline{CYF}$ | 3 | | | | |
| (AR=4)·$\overline{CYF}$ | 4 | $\underline{◇}$ | | SUBTOT (79) | MEM≠0 |
| | | | X | MUEQ (75)+EQAD (71)+ EQSU (73) | $\overline{K}$ |
| (AR=5)·$\overline{CYF}$ | 5 | * | | TOT (78) | MEM=0 |
| | | | ÷ | DVEQ (77)+EQAD(71)+EQSU (73) | $\overline{K}$ |
| (AR=6)·$\overline{CYF}$ | 6 | $\underline{*}$ | | TOT (78) | MEM≠0 |
| (AR=7)·$\overline{CYF}$ | 7 | # | | MUEQ (75)+DVEQ (77) | K |
| | | | ◁ | MUEQ (75)+DVEQ (77)+EQAD (71)+EQSU (73) | $\overline{K}$ |
| (AR=8)·$\overline{CYF}$ | 8 | | | | |
| (AR=9)·$\overline{CYF}$ | 9 | | F | CL (65) | |
| (AR=0)·CYF | • | | | | |

FIG. 27.

LEGEND

+ = OR

· = AND

— = NOT

FIG. 25

PRINT SCAN LOGIC

INITIAL CONDITIONS = PRINT, CLKF, DD=15, COMPF, $\overline{TBF}$, $\overline{DPF}$, $\overline{CYF}$ PS 1 [PRINT·CLKF]·($\overline{PS2}$)·($\overline{PS3}$)·($\overline{PS6}$) ⇒ (DD DN)

PS 2 [PRINT·CLKF]·($\overline{MEM=0}$) ·($\overline{PS5}$) ⇒ (DD UP), (15 TO AR), (SET TBF)

PS 3 [PRINT·CLKF]·(DD=DS+1)·($\overline{PS2}$)·($\overline{PS5}$) ⇒ (15 TO AR), (SET TBF)

PS 4 [PRINT·CLKF]·$\overline{DPF}$·TBF·($\overline{DD=0}$) ⇒ (AR TO MEM)

PS 5 [PRINT·CLKF]·TBF ⇒ (SET DPF)

PS 6 [PRINT·CLKF]·DPF·(DD=0) ⇒ (RST CLKF), (0 TO AR), (0 TO DD)

PS 7 PRINT·$\overline{READY}$·ENGAGE ⇒ SET CARRIERF

PS 8 $\overline{PRINT}$ ⇒ RST CARRIERF

FIG. 26

SYMBOL & NUMBER PRINT LOGIC

INITIAL CONDITIONS = PRINT, $\overline{CLKF}$, DD=0, TBF, DPF, $\overline{CYF}$, COMPF P 1 READY·CARRIERF·(SYNC PULSES) ⇒ (CLK')
P 2 [PRINT·$\overline{CLKF}$]·CYF ⇒ (AR UP)
P 3 [PRINT·$\overline{CLKF}$]·CYF ⇒ (RST CYF)

P 4 [PRINT·$\overline{CLKF}$]·CYF·($\overline{P6}$)·($\overline{P11}$)·($\overline{P15}$) ⇒ (DD UP)

SYMBOL #2
P 5 [PRINT·$\overline{CLKF}$]·(DD=0)·$\overline{CYF}$·TBF·(S2)·CLK' ⇒ (HAMPP)
P 6 [PRINT·$\overline{CLKF}$]·(DD=0)·CYF·TBF ⇒ (RST TBF)

SYMBOL # 1
P 7 [PRINT·$\overline{CLKF}$]·(DD=0)·$\overline{CYF}$·$\overline{TBF}$·(S1)·$\overline{CL}$·CLK' ⇒ (HAMPP)
P 8 [PRINT·$\overline{CLKF}$]·(DD=0)·CYF·$\overline{TBF}$·(DS=0) ⇒ (SET TBF)
P 9 [PRINT·$\overline{CLKF}$]·[(DD=DS-R+1)+($\overline{MEM=0}$)·($\overline{DD=0}$)] ⇒ (RST DPF)

NUMERALS
P10 [PRINT·$\overline{CLKF}$]·($\overline{DD=0}$)·$\overline{CYF}$·(MEM=AR)·($\overline{TBF·DD=DS+1}$)·($\overline{DPF}$+DD=DS-R+1)·COMPF·$\overline{CL}$·CLK' ⇒ (HAMPP)

DECIMAL POINT
P11 [PRINT·$\overline{CLKF}$]·CYF·[TBF·DD=DS+1] ⇒ (RST TBF)
P12 [PRINT·$\overline{CLKF}$]·CYF·[TBF·DD=DS+1]·$\overline{CL}$·CLK' ⇒ (HAMPP)

END OF PRINT
P13 [PRINT·$\overline{CLKF}$]·(MEM=15)·($\overline{DD=0}$) ⇒ (RST COMPF)
P14 [PRINT·$\overline{CLKF}$]·$\overline{TBF}$ COMPF ⇒ (END OF PRINT), (0 TO DD), (0 TO MEM)
P15 [PRINT·$\overline{CLKF}$]·(DD=15)·CYF ⇒ (END OF PRINT), (0 TO DD), (RST COMPF)

ELECTRONIC PRINTING DIGITAL CALCULATOR

BACKGROUND OF THE INVENTION

The invention relates to printing electronic digital calculators and more particularly to calculators of the type having a system for performing arithmetic computations of coded decimal factors, including internally stored logic instructions for controlling the performance of said computations automatically.

In an age of large computers, the need continues to exist for business machines for handling computations which do not require the capacity of a computer. However, speed, accuracy and efficiency are just as necessary in handling these calculations, as in performing computations requiring millions of memory bits.

Calculators for handling arithmetic calculations are quite sophisticated and incorporate principles found in large computers. In order to utilize the speed available in computer principles, it is increasingly urgent that the electronic components of the calculator be organized for the most efficient use. This entails the utilization of the components in more than one capacity in the calculator operation, while performing as many functions as possible automatically. Operator functions not only take time but provide opportunity for error.

It is therefore the object of this invention to provide an improved printing electronic digital calculator.

It is a further object of this invention to increase the speed and efficiency of electronic calculators by utilizing components in more than one capacity.

SUMMARY OF THE INVENTION

The objects of this invention have been achieved by utilizing a single arithmetic register for all transfer functions, for storing and algebraically increasing factors in all computation functions, and for counting pulses in the synchronization of the printing functions in an electronic digital calculator, all under the control of logic stored in the calculator. Additionally, a pair of registers, each with its own logical designation, in the memory of the calculator is treated as an entry register with two individually addressable logic word locations. A logic word change system transposes the addresses of the logic words obviating the necessity of certain physical transfers of a word from one location to the other in arithmetical computations.

The invention will be more clearly understood by referring to the following detailed description of the preferred embodiment and the associated drawings in which:

FIG. 3 is an example of the keyboard codes;

FIG. 7 is a table of the listing start logic;

FIG. 8 is a table of the listing shift logic;

FIG. 9 is a circuit diagram of the AK word-change circuit;

FIG. 9A is a logic table for FIG. 9;

FIG. 10 is a block diagram of the calculator state sequencing for addition or subtraction;

FIG. 11 is a table of the addition or subtraction start logic;

FIG. 12 is a table of the addition or subtraction logic;

FIG. 12A is a table of the scale-of-ten counter logic;

FIG. 16 is a table of the clear operation start logic;

FIG. 18 is a table of the total or subtotal start logic;

FIG. 19 is a table of the move operation logic;

FIG. 22 is a diagram of the divide operation memory flow;

FIG. 23 is a diagram of the divide example;

FIG. 24 is a schematic diagram of the printer;

FIG. 25 is a table of the print scan logic;

FIG. 26 is a table of the symbol and numeral print logic;

FIG. 27 is a table of print characters;

FIG. 28 is a table of symbol decoding logic.

To facilitate the understanding of the invention the detailed description has been divided into nine parts as follows:

| | |
|---|---|
| Part I | General description |
| Part II | Keyboard |
| Part III | Listing operation |
| Part IV | AK Word-Change circuit |
| Part V | Addition and subtraction operation |
| Part VI | Clear operation |
| Part VII | Total and subtotal operation |
| Part VIII | Multiplication and division operation |
| Part IX | Print operation |

DETAILED DESCRIPTION OF THE PREFERRED EMBODIMENT

Part I—General Description

Figure 1:
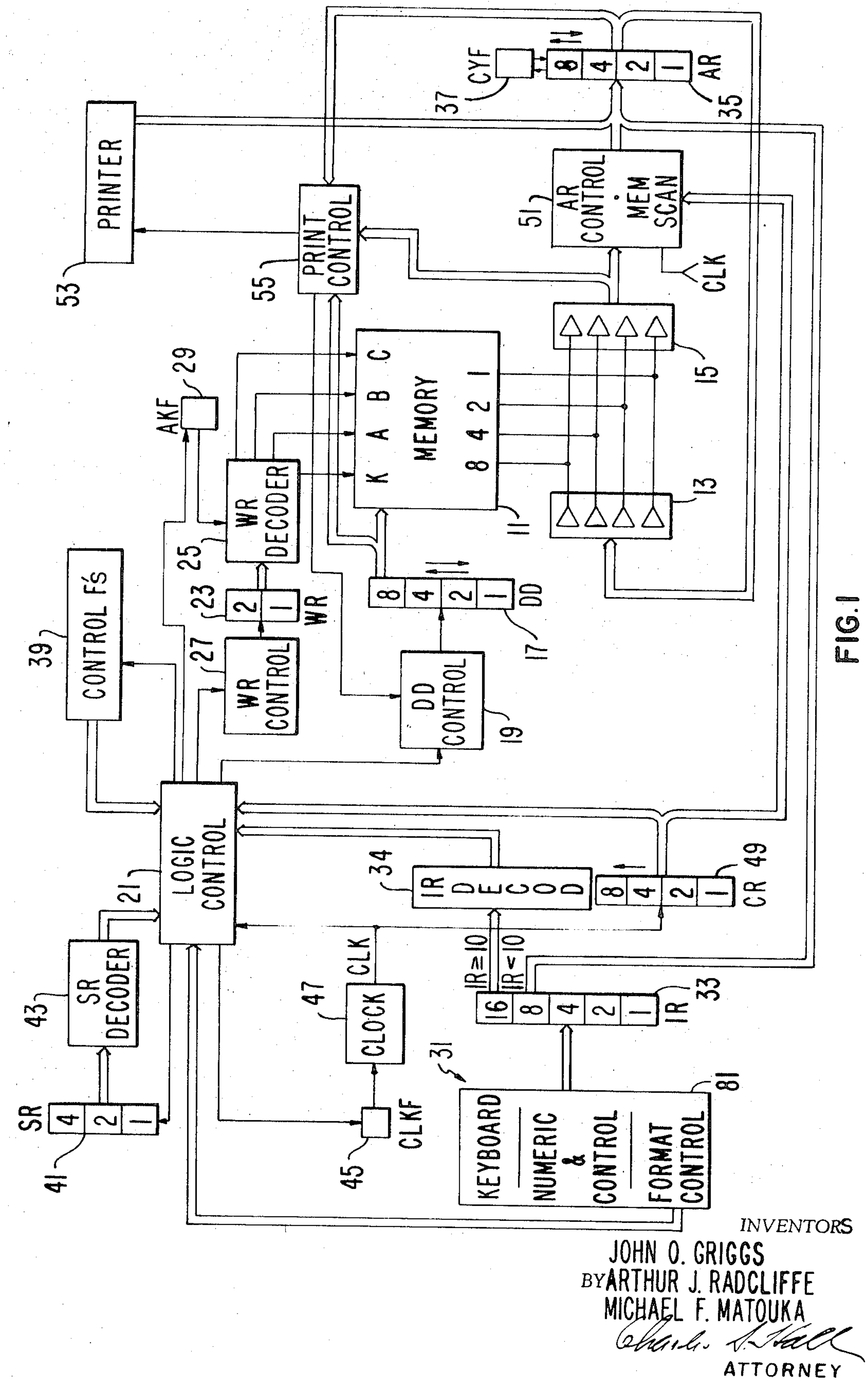
FIG. 1 is a general block diagram of an electronic calculator embodying the present invention.

Refer now to FIG. 1 which shows a general block diagram of an electronic calculator embodying the present invention.

A memory 11 having word locations or registers designated, for example, K, A, B, and C is provided for storing factors for arithmetic processing. Word K and word A are used for initially entering factors into the memory, as well as for other functions in some of which they are treated as a single register; word B is used as an accumulator; and word C is used as an auxiliary register particularly in a multiply or divide computation. Each word in the illustrated embodiment contains 16 digits (0 and 1 through 15) with each digit comprising four flip-flops (not shown) for storing a number in 8–4–2–1 binary coded decimal. The zero digit is used to store the sign of a factor while the one through 15 digits are used to store the factor. Write amplifiers 13 and read amplifiers 15 are provided to transfer signals to and from the memory, respectively.

Access to a digit of a word and stepping from digit to digit in a word in the memory is performed by a decimal digit register (DD) 17 comprising four flip-flops arranged in an up-down counter. A DD control 19, such as a decoder for presetting a number in a register under instructions from a logic control unit 21, operates to position the DD 17 to the proper count during the various operations.

Access to a word in the memory is performed by a word register (WR) 23 comprising two flip-flops coupled through a WR decoder 25 to words K, A, B and C. The WR 23 is set to the proper state by a WR control 27 operating under instructions from the logic control unit 21. An AK word-change flip-flop (AKF) 29 has its output connected to the WR decoder 25 for changing the logical designation of word K and word A by changing the word line to be selected when the WR 23 is in a given state. For example, if the state 00 and 01 of the two flip-flops in the WR 23 select words K and A, respectively, when the AKF 29 is set, then resetting the AKF transposes or redesignates the selected words, so that the state 00 and 01 will select words A and K, respectively. This permits easy transfer of a factor designation instead of a physical transfer of a factor digit-by-digit from one word to another.

A keyboard 31 is provided having five keyboard encoding switches (described in detail with respect to FIGS. 2 & 5) activated by pressure operated keys for entering both numeric and control information. The keyboard switches are coupled to an instruction register (IR) 33 comprising five flip-flops with each switch being associated with a respective one of the flip-flops. The information appears in the IR 33 in 16–8–4–2–1 binary coded decimal and the numeric information is contained in the field $IR<10$ while the control information is contained in the field $IR \geq 10$. The keyboard also includes a format control unit 81 for instructing the logic control unit 21 as to the physical location of the decimal point and the number of significant decimals to be retained in a memory word register.

Numeric information entered on the keyboard is transferred from the IR 33 to an arithmetic register (AR) 35 comprising four flip-flops and a carry flip-flop (CYF) 37 arranged as an up-down scale-of-ten counter. The numeral is then transferred from the (AR) 35 to the write amplifiers 13 and into the proper memory location.

Control information entered on the keyboard is transferred from the IR 33 to the logic control unit 21 through an IR decoder 34. The logic control unit 21 is coupled to a group of six control flip-flops 39 which is used by the logic control unit for intermediate storage in performing the calculator operations. The control flip-flops are designated alarm (ALARMF), decomplement (DPF), complement (COMPF), type bar (TBF), exceed capacity print (ECPF), and print carrier (CARRIERF). The logic control unit 21 is also coupled to a status register (SR) 41. The SR 41 comprises three flip-flops, set by the logic control unit 21, and is coupled through an SR decoder 43 back to the logic control unit. As the logic control unit moves through the sequence of states necessary to perform an operation, the SR 41 is set in the state indicative of the operation to be performed. Thus, the logic control unit 21 and the SR 41 operate as a state machine to select a group of logic expressions which are repeatedly used in operations performed by the calculator.

The logic control unit 21 sets a clock flip-flop (CLKF) 45 which turns on a clock 47 providing a source of synchronizing clock pulses (CLK). The clock pulses are supplied to the logic control unit 21 and to a control register (CR) 49. The CR 49 comprises four flip-flops arranged as an up counter and is coupled both to an AR control 51 and to the logic control unit 21.

The AR control 51, which is also supplied with clock pulses, operates to control the operation of the AR 35 and to cause the AR to operate as a scale-of-ten counter. The AR control 51 also includes memory scan logic expressions for performing an addition or subtraction calculation.

Addition is performed by transferring the first digit of the accumulator, word B, to the AR 35, as explained later in detail. The first digit of the addend in word K is then examined by the memory scan logic and a number of pulses equal to the integer stored in the first digit is applied to count the AR 35 up. The sum digit in the AR 35 is then returned to the first digit of the accumulator, word B, and the remaining digits are added in a similar fashion. Any carry generated in the addition of a digit is applied to count the AR 35 up one place during the addition of the next higher order digit. In the case of subtraction, the same steps are performed except that the AR 35 is counted down and the difference is decomplemented, if necessary, after the subtraction. The tens complement of the difference is obtained by using the AR 35 to perform a subtraction as explained later in detail.

Generally, multiplication is performed in the calculator by a number of additions of the multiplicand equal to the least significant digit of the multiplier to form a partial product. The partial product is then shifted right one place and the next partial product is added to the first, with the formation of partial products continuing until all digits of the multiplier have been processed. Division is performed in a similar manner by repeated subtractions of the division from the dividend followed by shifting the dividend left one place. The quotient is formed by counting the number of subtractions necessary to reduce the dividend to an amount less than the divisor.

A printer 53 is provided for recording information stored in the calculator. The printing is accomplished by a print hammer impacting a recording medium against a desired one of a matrix of characters on a rotating drum in the printer. Row synchronization signals are generated by the printer as a character is aligned with the print hammer and are coupled to the AR 35 to cause the AR to count up. A print control 55 compares the count in the AR 35 of the row synchronization pulses with a digit of the word to be printed from the memory 11 and produces an alignment signal when the print hammer is aligned with the proper character, thereby causing the print hammer to print. The print control also receives the digit being addressed by the DD 17 for use in controlling the printer and steps the DD 17 from one digit address of the word being printed to another.

The arithmetic register 35 is, therefore, used in a plurality of functions including transfer of digits seriatim from IR 33 to the memory 11, transfer of logic words from one register of the memory to another, storing a factor and increasing it algebraically in arithmetic computations, and counting for synchronization purposes in printing operations.

Part II—Keyboard

Figure 2:
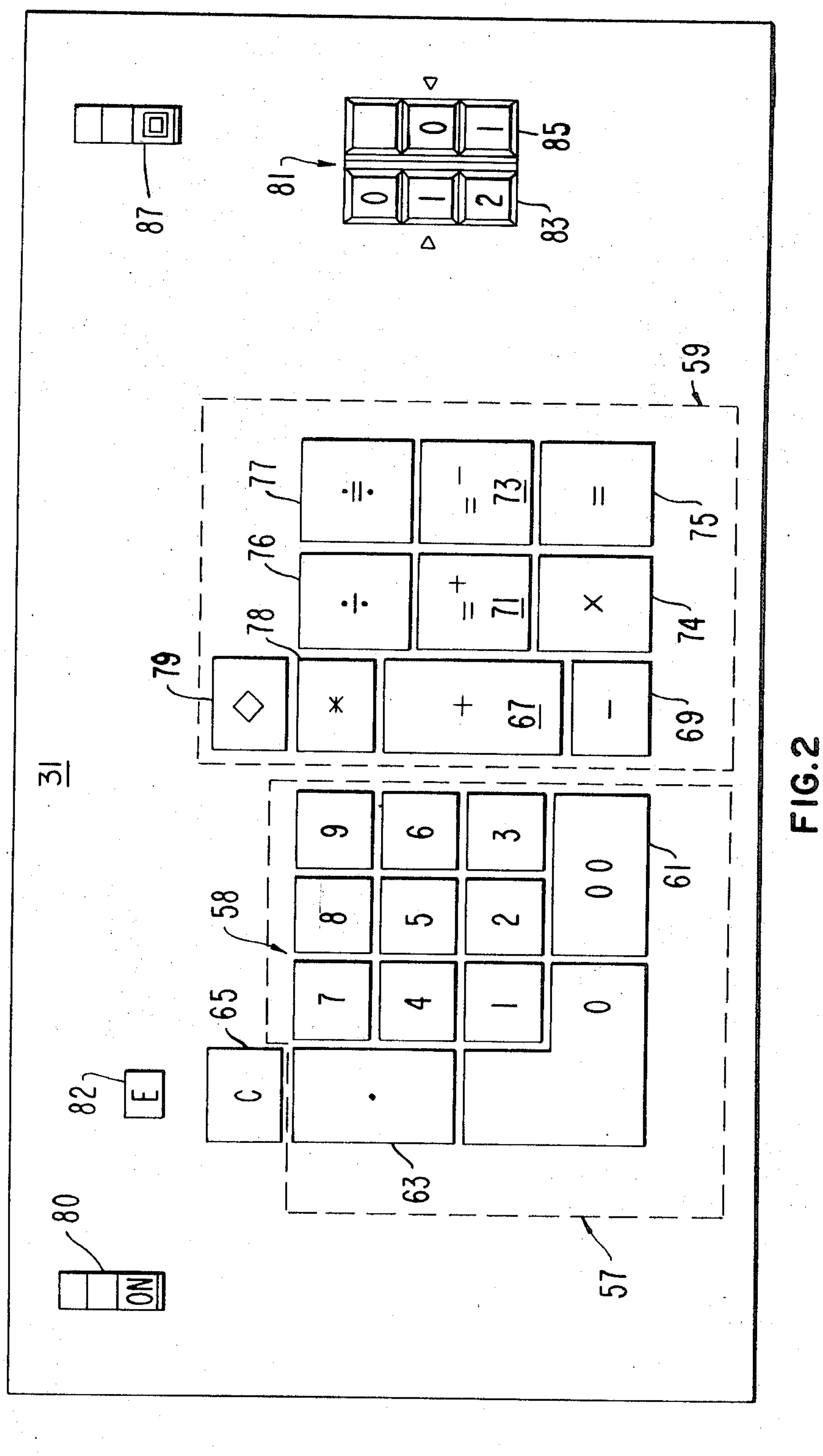
FIG. 2 is a plan view of the keyboard.

Referring now to FIG. 2 the keyboard 31 utilized in the present invention is shown in detail. The keyboard contains a listing key section 57 and a control key section 59 for entering information into the calculator. The keys are pressure operated and selectively activate a group of five encoding switches 105 (shown in FIG. 5) to encode the indexed information. The encoded information is then stored in the IR 33 shown in FIG. 1.

The listing section 57 includes a 10 key keyboard 58 having keys for indexing the numerals 0–9. Each key is marked with the numeral which the key represents and selectively activates the encoding switches 105 to encode the numeral in 8–4–2–1 binary coded decimal form. Also, included are a double zero (DZ) key 61 and a decimal point (DP) key 63.

A clear key 65 is provided to clear erroneous operator entries into the calculator and for resetting the calculator when an alarm condition appears.

The control section 59 includes an add key 67, a subtracting key 69, an equal add key 71 and an equal subtract key 73. The add and equal add keys are used to enter an addition instruction while the subtract and equal subtract keys are used to enter a subtraction instruction. An enter multiply key 74 and a multiply equal key 75 are provided for performing multiplication while an enter divide key 76 and a divide equal key 77 are provided for performing division. The equal add key 71 and the equal subtract key 73 may also be used to perform a multiplication or division operation and combine the result with the contents of the accumulator, word B. A total key 78 and a subtotal key 79 are also provided for indexing these operations. A power switch 80 to supply power to the calculator and initiate a reset of the calculator and an alarm light 82 are also provided.

FIG. 3 shows a table of a coding arrangement which may be used with the keys. The first column gives the key top marking of a key while the second column gives the binary designation of the encoding switches 105 which are activated by each key. The third column gives the logic term used hereinafter in the logic expressions of the logic control unit 21 for the instruction of a key. No logic term is used for the numerals 0–9.

The keyboard 31 also contains the format control unit 81 comprising a decimal select section and a round-off section. The decimal select section includes a rotatable decimal digit 83 that can be set from 0–6 for physically locating the decimal point by indicating the number of digit positions between the decimal point (DS) and the right side of a memory word register. The round-off section includes a rotatable round-off dial 85 that can be set from 0–6 for indicating the number of digits to the right of the decimal place (DS) to be retained (R) in a factor. An automatic decimal point switch 87 is used to automatically enter the decimal point at the location set by the decimal select dial 83, as explained hereinafter.

Figure 4:
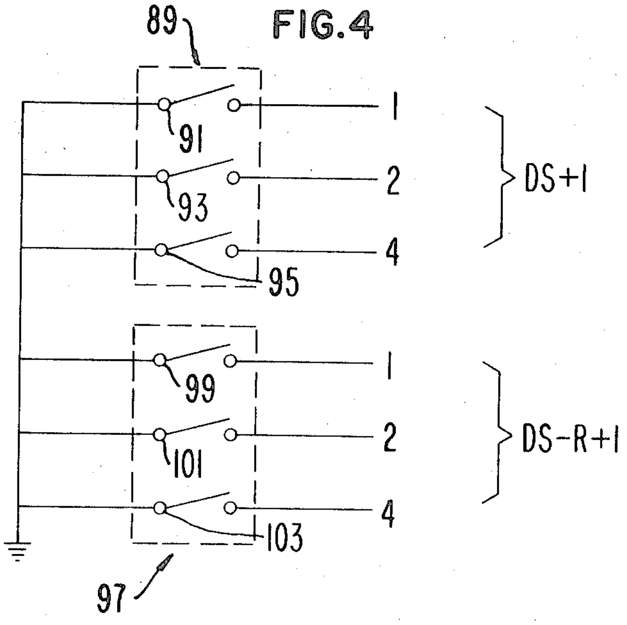
FIG. 4 is a schematic diagram of the format control unit.

Refer now to FIG. 4 which shows a schematic drawing of the format control unit 81. The decimal coding section 89 comprises three switches 91, 93 and 95, representing the binary values 1, 2 and 4, respectively. The switches 91, 93 and 95 are selectively activated by the decimal dial 83 to give a binary representation of the decimal setting plus 1 (DS+1) which is used in the logic control unit 21 in entering a factor. The round-off coding section 97 comprises three switches 99, 101 and 103, representing the binary values 1, 2 and 4, respectively. The round-off dial 85 selectively activates the switches 99, 101 and 103 to give a binary representation of the decimal place setting minus the round-off setting plus one (DS−R+1), which is utilized by the logic control unit 21 in rounding off a word as it is being entered in the memory.

Figure 5:
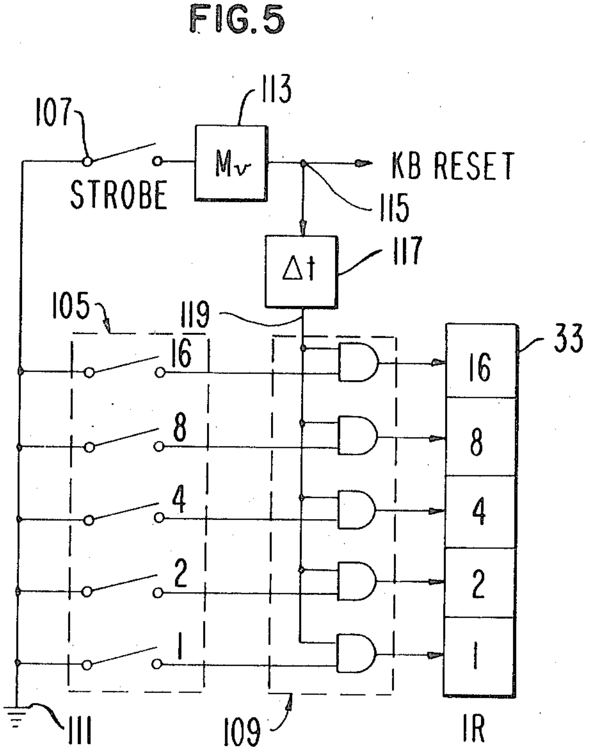
FIG. 5 is a schematic diagram of the keyboard to instruction register circuitry.

FIG. 5 shows a schematic diagram of the keyboard-to-IR transfer circuit. The keyboard comprises five encoding switches 105 representing the binary values 16, 8, 4, 2, and 1, as stated previously, and a strobe switch 107. Each of the encoding switches 105 is connected to the input of a respective one of AND-gates 109 and to a source of reference potential 111. As previously mentioned, the IR 33 comprises five flip-flops also representing the binary values 16, 8, 4, 2, and 1. The output of each of the AND-gates 109 is connected to the one of the flip-flops in the IR 33 which represents the same binary value as the encoding switch connected to the AND gate.

The strobe switch 107 is connected to the source of reference potential 111 and to a conventional monostable multivibrator 113. The output 115 of the multivibrator is connected to a conventional time delay circuit 117. The output 119 of the time delay circuit 117 is connected to an input of each of the AND-gates 109 and serves as a keyboard-to-IR transfer signal to enter the information in the encoding switches into the IR 33.

The keys on the keyboard operate, as they are depressed, to selectively activate the encoding switches 105 and give a binary representation of the instruction of the depressed key, as known in the art. After the encoding switches are activated, further depression of a key activates the strobe switch 107, as well known in the art, and a pulse output 115 occurs from the multivibrator. The pulse output 115 serves as a keyboard-reset signal to reset various flip-flops and registers in the calculator, as explained hereinafter.

The pulse output 115 of the multivibrator is delayed by the time delay circuit 117 until the reset of the calculator has been performed. The output 119 of the time delay circuit 117 then enables the AND-gates 109 and transfers the encoded information in the encoding switches 105 to the IR 33.

The keyboard-reset signal resets the flip-flops in the CR 49, IR 33, WR 23, and AR 35. Also, the CYF 37 and the control flip-flop DPF are reset. Resetting the WR 23 to the 00 state causes the WR decoder 25 to select the word K address in the memory, as described previously. If a keyboard reset occurs when the SR 41 is in the Idle state, which is the quiescent state assumed by the calculator, then the DD 17 and control flip-flop COMPF are also reset in addition to the above. Resetting the DD 17 selects the DD=0 address with the result that the memory will be accessed at the word K and DD=0 address. A power-on reset is initiated when power is applied to the calculator by power switch 82, and performs all the above resets and additionally resets the control flip-flop ALARMF and the SR 41. After the power-on reset, all the flip-flops in the SR 41 will be in the reset condition which corresponds to the Idle state.

Part III—Listing Operation

The listing keys 57 on the keyboard which enter listing information to the IR 33 comprise the 10 numeric keys 58 marked 0–9, the double zero key 61 and the decimal point key 63. The IR decoder 34 examines the IR 33 and provides listing instructions of IR<10, IR=DP (decimal point) and IR=DZ (double zero) as the listing information is indexed on the keyboard. The listing instructions utilized by the listing start logic are the equations shown in FIG. 7 and the listing shift logic are the equations shown in FIG. 8, all of which equations define part of the logic control unit 21, for entering the listing information into the memory 11.

The IR decoder 34 comprises a plurality of logic gates coupled to the IR 33 which provide output signals, one at a time, indicative of the condition of the IR 33. The IR coding, as shown in FIG. 3, for the instruction *IR=DP* would be a binary ONE in the 8, 2, and 1 flip-flops and a binary ZERO in flip-flops 16 and 4 of the IR 33. Therefore, an AND gate having the inputs $\overline{IR16}$, IR8 $\overline{IR4}$, IR2 and IR1 would provide an output when IR=DP. Other logic gates in the IR decoder 34 are connected to the IR 33 in a similar fashion to provide signals indicative of the logic terms shown in the right-hand column of FIG. 3. The structure and function of a register decoder are well known in the art. Therefore, the arrangement of the logic gates in the IR decoder 34 would be obvious to a person of ordinary skill in the art and is not further included in this description.

Figure 6:
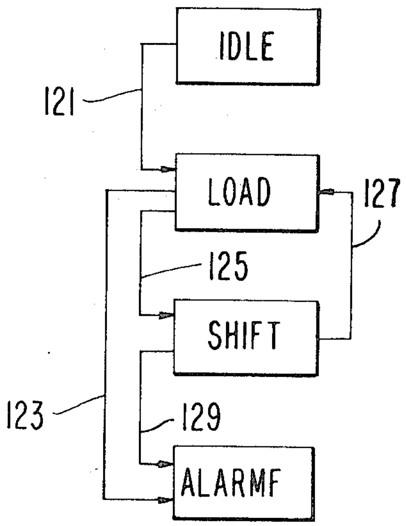
FIG. 6 is a state sequencing block diagram of the calculator giving a list of operations.

The state sequencing of the SR 41 during the listing operation is shown in FIG. 6. The listing operation sequences through three states, Idle, Load and Shift, set into the SR 41 by the logic control unit 21. The listing operation may also set an alarm condition in the control flip-flop ALARMF if the 15 digit plus sign bit capacity of a word is exceeded. The Idle state is the quiescent state assume by the calculator when the power is initially turned on, or when an operation is completed and the calculator is ready to perform another calculation.

After an integer is indexed on the keyboard 31 the calculator moves from the Idle state to the Load state as shown by path 121. During the Load state the indexed integer is transferred first from the IR 33 to the AR 35 and then from the AR into an accessed digit of word K in the memory. If the capacity of the word K is exceeded during the Load state the calculator sets the flip-flop ALARMF as shown by path 123. Under certain condition, to be detailed, the calculator goes from the Load state to the Shift state as shown by path 125. In the Shift state information stored in a word of the memory is shifted to the left and the indexed integer now in IR 33 is entered into the memory. After the calculator has performed the operation of the Shift state it then returns to the Load state, path 127, or if the capacity of word K is exceeded the calculator sets the control flip-flop ALARMF as shown by path 129.

With reference to FIG. 7 which shows the listing start logic and FIG. 8 which shows the listing shift logic, which logic is part of the logic control unit 21, the detailed operation of the calculator in processing listing information will be described. In the listing logic, the control flip-flop COMPF indicates that the decimal point key 63 has been indexed and the condition AUTO indicates that the automatic decimal switch 87 is engaged. Unless otherwise stated the operations performed by the listing logic and the other portions of the logic control unit, appearing on the right side of the equations, are gated with the clock pulses CLK produced by the clock 47 to synchronize the operation of the calculator.

All the logic equations of the control unit 21 are a representation of interconnected logic gates as known in the art. The logic equations give information on the functioning of the interconnected logic gates in a more easily understood form than would the interconnection diagram of the logic gates.

Assume now that an integer is indexed on the keyboard 31. The IR decoder 34 will contain the listing instruction IR<10. Before the integer is entered on the keyboard the calculator will be in the Idle state and the clock 47 will be off since the CLKF 45 is reset. The first step in the listing operation is performed by the logic of equation L1 and the CLKF 45 is set causing the clock oscillator 47 to emit a series of clock pulses CLK at the rate of, for example, 200 kHz. As shown in FIG. 1 the clock pulses are connected to the CR 49 and cause the CR to count up. The clock pulses are also supplied to the logic control unit 21 for synchronizing the operations performed by the logic. The AKF 29 is complemented by the logic of equation L2 thereby transposing the logical designation of word K and word A, in a manner to be detailed, and retaining any information which has been previously written in word K.

The calculator then proceeds to clear word K which was addressed by the WR 23 during the keyboard reset. The clearing of word K begins with *DD*=0 and is performed by the logic of equation L3 which transfers "0" to word K at *DD*=0 and steps DD 17 up. The clearing operation proceeds with a digit of word K being cleared and the DD 17 being stepped up until DD=15. At this time the logic of equation L4 will set the Load state into the SR 41. Since the decimal point key 63 has not been depressed, the condition $\overline{COMPF}$ is present and the logic of equation L5 will set the SR 41 to the Shift state, set the CLKF 45, reset the CYF 37 and transfer "15" to the DD 17.

The operation of the listing shift logic which is summarized in Table I will now be described in detail. The listing shift logic shown in FIG. 8 operates to shift a word to the left one digit and to enter the indexed integer into the memory 11. The shifting operation comprises a plurality of repetitive cycles, having four steps to a cycle and is stepped through each cycle by the CRIF and CR2F flip-flops in the CR 49. Since the CLKF 45 is set, the CR 49 is counted up during the application of the clock pulses CLK and the CRO count ($\overline{CR1F}$ and $\overline{CR2F}$), CR1 count (CR1F and $\overline{CR2F}$), CR2 count ($\overline{CR1F}$ and CR2F), and CR3 count (CR1F and CR2F) provide four counts to step the listing shift logic through a cycle.

TABLE I.—OPERATION OF LISTING SHIFT LOGIC

| | CR count | DD | Operation | Eq. # |
|---|---|---|---|---|
| Cycle 1 | 0 | 15 | test for error | LS 2 |
| | 1 | 15 | Clear $K_{15}$ DDup | LS 3 |
| | 2 | 0 | AR to $K_0$ DDdn | LS 5, 6 |
| | 3 | 15 | DDdn | LS 10 |
| Cycle 2 | 0 | 14 | $K_{14}$ to AR | LS 1 |
| | 1 | 14 | Clear $K_{14}$ DDup | LS 3 |
| | 2 | 15 | AR to $K_{15}$ DDdn | LS 5, 6 |
| | 3 | 14 | DDdn | LS 10 |
| Cycle 3 | 0 | 13 | $K_{13}$ to AR | |
| | 1 | 13 | Clear $K_{13}$ DDup | |
| | 2 | 14 | AR to $K_{14}$ DDdn | |
| | 3 | 13 | DDdn | |
| Cycle 15 | 0 | 1 | $K_1$ to AR | |
| | 1 | 1 | Clear $K_1$ DDup | |
| | 2 | 2 | AR to $K_2$ DDdn | |
| | 3 | 1 | DDdn | |
| | 0 | 0 | $K_0$ to AR | LS 1 |
| | 1 | 0 | set TBF Clear $K_0$ DDup | LS 3, 4 |
| Cycle 16 | 2 | 1 | IR to AR; (DS+1) to DD if $\overline{auto}$ | LS 8 |
| AR=0 | | | (DS−R+1) to DD if auto | LS 9 |
| IR<10+DZ | 3 | (DS+1) if $\overline{auto}$ | AR to $K_{DD}$ and | LS 12 |
| | | (DS−R+1) if auto | set LOAD resetCLKF | LS 13 |
| | 0 | 0 | $K_0$ to AR | LS 1 |
| | 1 | 0 | Cear $K_0$ DDup | LS 3 |
| Cycle 16 | 2 | 1 | DDdn | LS 6 |
| AR≠0 | 3 | 0 | DDdn ARdn | LS 10, 11 |
| | | 15 | returns to cycle 1 | |
| | 0 | 0 | $K_0$ to AR | LS 1 |
| Cycle 16 | 1 | 0 | set TBF Clear $K_0$ DDup | LS 3, 4 |
| AR=0 | 2 | 1 | (DS+1) to DD | LS 7 |
| IR=DP | 3 | (DS+1) | set LOAD reset CLKF | LS 13 |

The first cycle of the shifting operation begins with the $DD$=15, as provided when the shift state was set by the logic of equation L5. Also note that $AR$=0 as the result of the keyboard reset which occurred when the listing information was indexed. During the CRO count the memory is tested by equation LS2 to assure that the capacity of word K has not been exceeded. If the $DD$=15 digit of word K is nonzero then an integer has been entered in digit K 15 and a subsequent left shift of word K would lose the integer stored in digit K 15. Thus the capacity of word K has been exceeded and a listing exceed capacity (LSTEC) signal is generated.

During the CR1 count the logic of equation LS3 transfers "0" to the accessed digit of the memory thereby clearing digit K15, and the DD 17 is counted up to 0. In the CR2 count the logic of equation LS5 then writes the information in the AR 35 into digit K0 and the logic of equation LS6 steps the DD 17 down to 15. In this case a zero will be written into digit K0 since $AR$=0. During the CR3 count the DD 17 is stepped down to 14 by the logic of equation LS 10. Thus, in cycle 1 the information in the AR 35, which, as will become apparent, represents the number of shifts minus one, is transferred to digit K0.

Cycle 2 begins with $DD$=14 and during the CR0 count the logic of equation LS1 reads the digit K14 by transferring the integer in digit K14 to the AR 35. In the CR1 count digit K14 is cleared and the DD 17 is counted up to 15. In the CR2 count digit K14, stored in the AR 35, is written into digit K15 and the DD 17 is stepped down to 14. In the CR3 count the DD 17 is stepped down to 13. Thus, in cycle 2 the information in the 14th digit of word K is transferred to the 15th digit of word K and the DD 17 is stepped down to the 13th.

Cycle 3 operates in a manner similar to cycle 2. During the CR0 count digit K13 is read and then cleared in the CR1 count. The DD 17 is also stepped up to 14 in the CR1 count. In the CR2 count the integer read from digit K13 and stored in the AR 35 is written into digit K14 and the DD 17 is stepped down to 13. The DD 17 is then stepped down to 12 in the CR3 count.

An examination of cycle 2 and 3 reveals that a shift cycle comprises reading the $N$th digit of word K, clearing the $N$digit and stepping the DD 17 up to the N+1 digit, writing the $N$th digit in the N+1 digit by transfer through AR 35 and stepping the DD 17 down to the $N$th digit, and then stepping the DD 17 down to the N−1 digit. The result of this sequence is to shift the $N$th digit in word K to the left one place.

The shift operation continues, through cycle 15 following the pattern of cycles 2 and 3. At the end of cycle 15 during the CR3 count the DD 17 is stepped down to 0 and digit K1 has been shifted to digit K2. Recall now that in cycle 1 $AR$=0 was written in digit K0.

Cycle 16 begins with $DD$=0 and during the CR0 count digit K0 is transferred to the AR 35 by the logic of equation LS1. In the CR1 count, digit K0 is cleared and the DD 17 is stepped up to 1 by the logic of equation LS 3, and since $AR$=0 and $DD$=0, the control flip-flop TBF is set by the logic of equation LS4. During the CR2 count the integer in the IR 33 is transferred to the AR 35 and the DD 17 is set to the digit DS+1 by the logic of equation LS8 if the automatic decimal switch 87 is not engaged. If the automatic decimal switch is engaged, the DD 17 is set to be digit DS−R+1 by the logic of equation LS9. In the CR3 count the integer in the AR 35 is written by the logic of equation LS12 in the digit of word K accessed by the DD 17. The DD 17 is set to either DS+1 or DS−R+1 depending on whether or not the automatic decimal switch 87 is engaged. Also the logic of equation LS 13 sets the SR 41 to the Load state and resets the CLKF 45 which turns off the clock 47.

Thus, in cycle 16, if the automatic decimal switch 87 is not engaged, the integer in the IR 33 is transferred to the AR 35 and then into the digit immediately to the left of the decimal point. If the automatic decimal switch 87 is engaged, the integer is transferred to the last-retained digit to the right of the decimal point.

As subsequent integers are entered in the AUTO condition the integers already stored in word K will be shifted to the left one digit with the result that the decimal point will be properly placed in the factor to be entered without depression of the decimal point key. As an example assume that *DS*=3 with *R*=2 and that the factor "4.53" is to be entered in word K. The factor is entered most significant digit first and the integer "4" is indexed on the keyboard and stored in digit K2 since *DS*–*R*+1=2. The integer "5" is then indexed, word K is shifted left one digit with the integer "4" being shifted to digit K3 and the integer "5" is stored in digit K2. The integer "3" is then indexed and, word K is shifted left one digit and the integer "3" is stored in digit K2 completing the entry of the factor "4.53" with the integers "4," "5" and "3" being stored in digits K4, K3 and K2, respectively.

Assume now that the automatic decimal switch 87 is not engaged, As detailed above, upon indexing of an integer, word K is shifted left one digit and the indexed integer is entered in the digit DS+1 of word K. Since the automatic decimal switch 87 is not engaged, a decimal point must be entered on the keyboard. When the decimal point key 63 is indexed, the listing instruction $\underline{IR=DP}$ enables the logic of equation L7 since the condition $\overline{\text{AUTO}}$ exists and the logic operates to set the control flip-flop COMPF, reset the CLKF 45 and transfers DS+1 to the DD 17. The logic of equations L12 to 14 will then operate to enter subsequent integers.

After the decimal point has been entered the condition COMPF is present and, as a subsequent integer is entered in the CR0 count, the logic of equation L13 transfers the integer in the IR 33 to the AR 35 and steps the DD 17 down to digit DS. The logic of equation L14 then operates to transfer the integer in the AR 35 to digit DS of word K and reset the CLKF 45. The logic of equation L12 determines if the capacity of word K to the right of the decimal has been exceeded. If an integer is entered when *DD*=0, then the capacity of word K is exceeded and a listing exceed capacity (LSTEC) signal is generated and the CLKF 45 is reset. Thus, the listing logic enters the first integer listed after the decimal point in the digit to the right of the decimal point at digit location DS. The next integer is entered at DS–1 with the process continuing until an entire factor has been entered.

If the instruction double zero (DZ) is entered after the decimal point is entered, the logic of equation L13 steps the DD 17 down to digit DS and transfers "0" to the digit DS in the same manner as if the integer "0" had been indexed. However, the logic of equation L15 also operates to step the DD 17 down to the location DS–1. Since any subsequent integers will be entered in the digit DS–2, the digit DS–1 will retain the zero stored when word K was initially cleared by the logic of equation L3 upon entry of the first integer of a factor.

Assume now that the automatic decimal switch 87 is engaged and the decimal point key 63 is then indexed. The IR decoder 34 will provide the instruction *IR*=*DP* and the logic of equations L8 to L11 will be enabled. Since the condition $\overline{\text{COMPF}}$ is present indicating that a decimal point has not been previously entered, the logic of equation L8 transfers DS–R+1 to the DD 17 and DS+1 to the AR 35 and sets control flip-flop COMPF. The logic of equation L9 then steps the DD 17 and the AR 35 down one. The stepping down of the AR 35 and the DD 17 continues, assuming that R≠0, until the logic of equation L11 detects the *DD*=0 and AR 0 and operates to step the AR 35 down, transfers "15" to the DD 17, sets the Shift state in the SR 41, sets CLKF 45 and resets CYF 37. Thus, the logic of equations L9 and 11 operate to subtract DS–R+1 from both the DD 17 and the AR 35 leaving the value R in the AR 35. The logic of equation L11 also subtracts 1 from the AR 35 leaving the value R–1 in the AR.

As shown in Table 1, in cycle 1 of the shift operation, the value *AR*=*R*–1 is stored in digit K0. As previously mentioned, this value represents the number of shifts to be performed minus 1. The shift operation then proceeds from cycle 1 through cycle 15 in the manner described for the entering of an integer. However, in cycle 16 AR 0 and the calculator will not exit from the Shift state to the Load state since the *AR*=0 condition is not present in the logic of equation LS4.

Refer now to Table 1 and in particular to the portion showing cycle 16 when AR≠0. Cycle 16 begins with *DD*=0 and in the CR0 count digit K0 is transferred to the AR 35 by the logic of equation LS1 and contains the number of shifts to be performed less one, in this case R–1, which was stored in cycle 1. In the CR1 count digit K0 will be cleared and the DD 17 is stepped up to 1 by the logic of equation LS3. In the CR2 count the DD 17 is stepped down to zero by the logic of equation LS6, and in the CR 3 count, the DD17 is again stepped down one to 15 by the logic of equation LS10 and the AR 35 is stepped down 1 by the logic of equation LS11. The shift operation then returns to cycle 1 and transfers the value in the AR 35 to digit K0.

The shift operation proceeds again, shifting word K left 1 place. As cycle 16 begins *DD*=0 and digit K0 is examined by the logic of equation LS4 in the CR1 count to see if the required number of shifts has been performed. If a number of shifts equal to R, the number of digits retained to the right of the decimal point, has been performed, then *AR*=0 and the control flip-flop TBF is set by the logic of equation LS4. Also in the CR1 count the logic of equation L3 clears digit K0 and counts the DD 17 up. Since the IR decoder 34 contains the instruction *IR*=*DP*, in the CR2 count the logic of equation LS7 transfers DS+1 to the DD 17. In the CR3 count the logic of equation LS13 sets the Load state in the SR41 and resets the CLKF 45 thereby readying the calculator for the listing of an integer. However, if further shifts are necessary the calculator returns to cycle 1 and shifts word K left 1 place with the left shifts continuing until word K has been shifted leftward R places.

The effect of a number of leftward shifts equal to R, the number of digits retained to the right of the decimal point, is to shift the rightmost digit of the factor stored in word K to the digit DS+1, and set the DD 17 to the digit DS+1. Therefore, the factor is in the same condition as if the automatic decimal switch 87 has not been engaged. Any subsequent integers indexed on the keyboard 31 are entered by the logic of equations L12–15 in the same manner, detailed previously, as if the automatic decimal switch 87 had not been engaged.

Recall that the assumption R≠0 was made in order that the logic of equation L11 would operate to set the Shift state in the SR 41. If *R*=0 then no shifts are necessary to align the factor in word K and the logic of equation L10 will operate to transfer DS–R+1 to the DD 17 and reset the CLKF 45. Subsequent integers are then entered by the logic of equations L12 to L15 in the same manner, detailed previously, as if the automatic decimal switch 87 had not been engaged.

Part IV—AK Word-Change Circuit

The AK word-change circuit of FIG. 9 includes the WR Decoder 25, indicated by the broken line, which is coupled to the output of the WR 23, both of which are shown in FIG. 1. The AK flip-flop (AKF) 29 also coupled to the WR Decoder 25.

The WR Decoder 25 contains word-line 131 for forming the word lines K, A, B and C and word-change logic 133 for addressing words A or K to either of the physical locations A′ and K′ in the memory 11, depending on the state of AKF 29.

The word-line logic 131 comprises four AND gates 135, 137, 139 and 141. The AND-gate 135 has the inputs $\overline{\text{WR1}}$ and $\overline{\text{WR2}}$ from the WR 23 and forms an output on word-line K when *WR*=00. The AND-gate 137 has the inputs WR1 and $\overline{\text{WR2}}$ and forms an output on word line A when the *WR*=01. The AND-gate 139 has the inputs $\overline{\text{WR1}}$ and WR2 and forms an output on word line B when *WR*=10. The AND-gate 141 has the inputs WR1 and WR2 and forms an output on word-line C when *WR*=11. Thus, one of the word lines K, A, B, or C will be selected by the word-line logic 131 depending on the state of the two flip-flops WR1 and WR2 comprising the WR 23.

The word lines A and K are coupled to the word-change logic 133 having the outputs A′ and K′, which represent physical word locations in the memory 11. The AKF 29 is also coupled to the word-change logic 133. The AKF 29 has an input 143 from the logic control 21 which complements the state of the AKF when a signal complement AKF (COMP AKF) is received. The AND-gate 145 has the inputs word line A and condition AKF while the AND-gate 147 has the inputs word K and condition $\overline{\text{AKF}}$. The outputs of the AND-gates 145 and 147 are connected to OR!-gate 149 having an output forming the A' word location. Thus if word-line A is selected and the AKF 29 is set or if word-line K is selected and the AKF 29 is reset the physical memory location A' is enabled.

The AND-gate 151 has the inputs word line K and condition AKF while the AND-gate 153 has the inputs word-line A and condition $\overline{AKF}$. The outputs of the AND-gates 151 and 153 are connected to OR-gate 155 having an output forming the K' word location. Thus, if word-line K is selected and the AKF 29 is set or if word-line A is selected and the AKF 29 is reset the physical memory location K' is enabled.

FIG. 9A shows a logic table summarizing the operation of the AK word-change logic 133 of the WR Decoder 25. Assume that word line A is coded in the WR 23 and that the AKF 29 is in the set or ONE state, then word location A' is selected in the memory 11. If the AKF 29 is complemented and thereby placed in the reset or ZERO state, the word location K' is selected by word-line A. Now assume that word-line K is coded in the WR 23 and the AKF 29 is in the set state then the word location K' is selected in the memory. If the AKF 29 is complemented and thereby placed in the reset state then word location A' is selected by word-line K.

Thus, the AK word-change circuit operates to change the logic designation of the word locations A' and K' in the memory upon complementing of the AKF 29. In this way logic word K can be transferred to logic word A without having to perform a digit-by-digit transfer of the information in physical location K' to physical location A'. Instead, the AKF 29 is complemented, thereby changing the logical designation for the information stored in the locations K' and A' so that logic word K selects location A' and logic word A selects location K' in memory.

Part V—Addition or Subtraction Operation

FIG. 10 shows the state sequencing of the SR 41 in the calculator during the addition or subtraction operation. The SR 41 is in the Idle state or the Load state prior to the addition or subtraction operation. The calculator sequences from the Idle state by path 157 or from the Load state by path 159 to the Print state where the factor to be added or subtracted is recorded. From the Print state the calculator then sequences by path 161 to the Add state. In the Add state the factor stored in word K is added or subtracted to the factor in the accumulator (word B) and the result is stored in the accumulator. After completion of the addition or subtraction operation, the calculator sequences from the Add state to the Idle state by path 163, unless the capacity of Word B of the memory is exceeded. In the latter case the calculator sequences to the alarm condition and the control flip-flop ALARMF is set as shown by path 165.

FIG. 11 shows the addition or subtraction start logic which forms part of the logic control unit 21 for sequencing the calculator from the Idle or Load state to the Print state and subsequently to the Add state. Initially the calculator will be in the Idle or Load state and when an add or subtract instruction is indexed on the keyboard the logic of equation AS1 sets the SR 41 to the Print state, sets the CLKF 45, sets control flip-flop COMPF, resets the CYF 37, and transfers "0" to the CR 49 and "15" to the DD 17. An addition instruction (AD) or a subtraction instruction (SU) is provided by the logic of equation AS3 and equation AS4, respectively. The addition instruction is obtained whenever the add key 67 (AD1) or equal add key 71 (EQAD) is indexed while the subtraction instruction is provided whenever the subtract key 69 (SU1) or the equal subtract key (EQSU) 73 is indexed. When the factor to be computed has been printed by the printer 53 an "End of Print" signal will occur and the logic of equation AS2 will set word B in the WR 23, set the Add state in the SR 41, set the CLKF 45, reset the CYF 37, and transfer "0" to the CR 49.

Once the Add state is set in the SR 41 the addition and subtraction logic shown in FIG. 12, which forms part of the logic control unit 21, operates to perform the indexed calculation. In the addition and subtraction logic equations the control flip-flops COMPF and DPF are utilized with the condition $\overline{COMPF}$ indicating that addition is to be performed, the condition COMPF indicating the subtraction is to be performed and the condition DPF indicating that the initially computed difference must be decomplemented.

FIG. 12A shows the logic for operating the AR 35 and CYF 37 as a scale-of-ten counter which is part of the AR control 51. When the AR 35 is counting up and $AR=9$, the CYF 37 is set and "0" is transferred to the AR 35 by the logic of equation CT1. When the AR 35 is counting down and $\overline{AR=0}$, the CYF 37 is set and "9" is transferred to the AR 35 by the logic of equation CT2. The AR 35 counts up when performing an addition computation and counts down when performing a subtraction computation.

The logic of FIG. 12 operates to compute the sum $K_x \pm B_x$ and store the result in digit $B_x$. The calculation is performed serially beginning with the 1st digit and proceeding through the 15th digit. In the addition, the digit $B_x$ is transferred to the AR 35 and then any carry in the CYF 37 is added to the AR 35 by counting the AR up. The memory scan logic (MEMSCANL) steps the AR 35 up a number of times equal to the integer stored in $K_x$. The sum $B_x \pm K_x \pm$CYF appearing in the AR 35 is then transferred to digit $B_x$. The DD 17 is then stepped up to the X+1 digit with the process continuing until all fifteen digits in the factor have been computed and the calculator then sequences to the Idle state.

With reference to FIG. 12 the operation of the calculator will now be described in detail. Recall that when the Add state is set in the SR 41 by the logic of equation AS2, the CLKF 45 is set and the clock 47 begins to emit clock pulses CLK which count the CR 49 up. Thus, the CR 49 counts from 0 through 15 and returns to 0. These CR counts are used to step the logic of FIG. 12 through each of the cycles of a computation.

The first cycle begins with the WR 23 set to word address B and $\overline{DD=0}$. Initially, sign digit B0 is transferred to the AR 35 and the word address K is set during the $\overline{CR=0}$ count ($\overline{CR8F}\cdot\overline{CR4F}\cdot\overline{CR2F}\cdot\overline{CR1F}$) by the logic of equation A1.

In the CR=13 count (CR8F · CR4F · $\overline{CR2F}$ · CR1F) the word address B is set by the logic of equation A9. Also, in the CR=13 count the logic of equations A12 and 13 will determine whether the addition or the subtraction operation is to be performed. The sign digit B0 appears in the AR 35 and if an addition instruction (AD) has been indexed and the factor in word B is negative (AR=1), or if a subtract instruction (SU) has been indexed and the factor stored in word B is positive ($\overline{AR=0}$) the control flip-flop COMPF is set by the logic of equations A12 and A13 does not operate. Therefore, the control flip-flop COMPF remains in the reset state (COMPF) and an addition computation will be performed. In the $CR=14$ count (CR8F · Cr4F · CR2F · $\overline{CR1F}$), "0" is transferred to digit Bo by the logic of equation A14 thereby clearing the accessed digit of the memory. In the $CR=15$ count (CR8F · CR4F · CR2F · CR1F), the sign information in the AR 35 is returned to digit B0 and the DD 17 is stepped up to 1 by the logic of equation A 15.

Assume now that cycle 1 has determined that an addition operation is to be performed. Cycle 2 begins and the addition of the factor in word K to the factor in word B proceeds. In the $\overline{CR=0}$ count digit B1 is transferred to the AR 35 and word address K is set in the WR 23 by the logic of equation A1. In the $CR=1$ count ($\overline{CR8F}\cdot\overline{CR4F}\cdot\overline{CR2F}\cdot$CR1F), any carry appearing in the CYF 37 will be added to digit B1. If a carry is present the AR 35 is stepped up by the logic of equation A5 and the CYF 37 will be reset by the logic of equation A6. However, in the addition of the first digit to carry will be present.

From the $CR=2$ count through the $CR=12$ count, the memory scan logic (MEMSCANL) term of equation A8 enables the AR 35 to count up during a number of clock pulses equal to the integer in digit K1. Since, as previously mentioned, the operations performed by the logic equations are gated with the clock pulses, the AR 35 is stepped up when the signal "AR up" is present and a clock pulse occurs. Thus, the AR 35 is stepped up a number of times equal to the integer in digit K1. Since the AR 35 originally contained the integer stored in digit B1, the sum K1+B1+CYF is stored in the AR 35 at the end of the $CR$=12 count.

In the $CR$=13 period the word address B is set in the WR 23 by the logic of equation A9. In the $CR$=14 period "0" is transferred to digit B1 by the logic of equation A14 thereby clearing digit B1. In the $CR$=15 count the sum in the AR 35 is transferred to digit B1 and the DD 17 is stepped up to 2 by the logic of equation A15. Thus, the sum B1+K1+CYF is stored in digit B1.

Cycle 3 continues the computation with digit B2 being transferred to the AR 35. Any carry in the CYF 37 is then used to step the AR 35 up with the result that K2+CYF now appears in the AR 35. The memory scan logic then steps the AR 35 up a number of times equal to the integer stored in digit K2. Digit B2 is then cleared and the result B2+K2+CYF, stored in the AR 35, is transferred to digit B2.

The computation then proceeds with cycle 3 and continues in a similar manner until in cycle 15 the entire factor in word K has been added to the factor in word B and the sum is stored in word B. In the 15th cycle, $DD$=15 and the logic of equations A16 to A18 will operate the $CR$=15 count. Assuming that the capacity of the memory has not been exceeded, there will be no carry generated from the addition of digit K15 plus digit B15 and the condition $\overline{CYF}$ exists. Therefore, the logic of equation A18 sets the Idle state in the SR 41 and resets the CLKF 45 thereby turning off the clock 47. Also the logic of equation A16 resets the CYF 37 and sets the control flip-flop DPF. However, if a carry CYF is generated during the addition of the 15th digit the computing capacity of the calculator has been exceeded and the logic of equation A17 generates a computing exceed capacity (COMPEC) signal which sets the control flip-flop ALARMF and resets the CLKF 45.

In a subtraction operation the computation is performed in the same manner as an addition operation except that the AR 35 is stepped down instead of up. The subtraction operation is determined in the first cycle, as previously mentioned, by the logical equations A12 and A13 and the control flip-flop COMPF will be set. Therefore, the logic of equations A3 and A4 is used to perform a subtract carry and the logic of equation A7 is used to step the AR 35 down to subtract digit $K_x$ from digit $B_x$. If all fifteen digits have been subtracted and no carry in the CYF 37 is generated, it is not necessary to decomplement the difference and therefore the logic of equation A18 sets the Idle state in the SR 41 in the same manner as described for an addition computation.

Assume now that a carry is generated in the CYF 37 during the 15th cycle of the subtraction when $DD$=15 indicating that the difference is negative. Therefore, it is necessary to obtain the ten's complement of the difference and this operation is referred to as "decomplementing." . In the $CR$=15 count of the 15the cycle the logic of equation A18 does not operate since the condition CYF is present, but the logic of equation A16 operates to set the control flip-flop DPF and reset the CYF 37. Therefore, the Idle state is not set and the calculator returns to cycle 1 with $DD$=0 and control flip-flop DPF set. During the first cycle, in the $CR$=0 count, "0" is transferred to the AR 35 by the logic of equation A2. Note that since the logic of equation A1 does not operate, the word address B will be set in the WR 23 during the entire decomplement operation.

In the $CR$=13 count the logic of equation A10 operates to change the sign stored in digit B0 which is a necessary step in the decomplementing operations. If the difference in word B is positive, then $BO$=0 and the AR 35 is stepped up to 1 and is later written into digit B0. However, if the difference in word B is negative, then $BO$=1 and the logic of equation A10 does not step the AR 35 up and the "0" placed in the AR 35 during the $CR$=0 count is later written into digit B0. Therefore, equation A10 operates to change the sign digit BO of the difference stored in word B.

In the $CR$=14 count the logic of equation A14 transfers "0" to digit BO to clear the memory. In the $CR$=15 count the logic of equation A15 transfers the value in the AR 35 to digit BO and counts the DD 17 up to 1. The calculator now proceeds to compute the ten's complement of the difference in word B by subtracting the value in B from $10^{15}$.

The subtraction computation proceeds in the same fashion as previously described for the initial subtraction except that the logic of equation A2 will transfer "0" to the AR 35 instead of equation A1 transferring digit $B_x$ to the 35. Note that in the computation process, since $AR$=0 in the $CR$=1 count, the logic of equation A4 does not reset the CYF 37.

In the 15the cycle the subtraction of digit B15 occurs in the $CR$=0 to 12 count and then the logic of equation A 11 operates to reset the CYF during the $CR$=13 count. In the $CR$=14 count the logic of equation A14 clears digit B15 and in the $CR$=15 count, since the CYF 37 is in the reset condition, the logic of equation A18 operates to set the Idle state in the SR 41 and reset the CLKF 45 thereby turning off the clock 47. Thus, the original difference is decomplemented with the decomplemented difference appearing in word B and having the proper sign in sign digit B0. The calculator is then in the Idle state, ready to process additional information.

Figures 13, 15, 17:
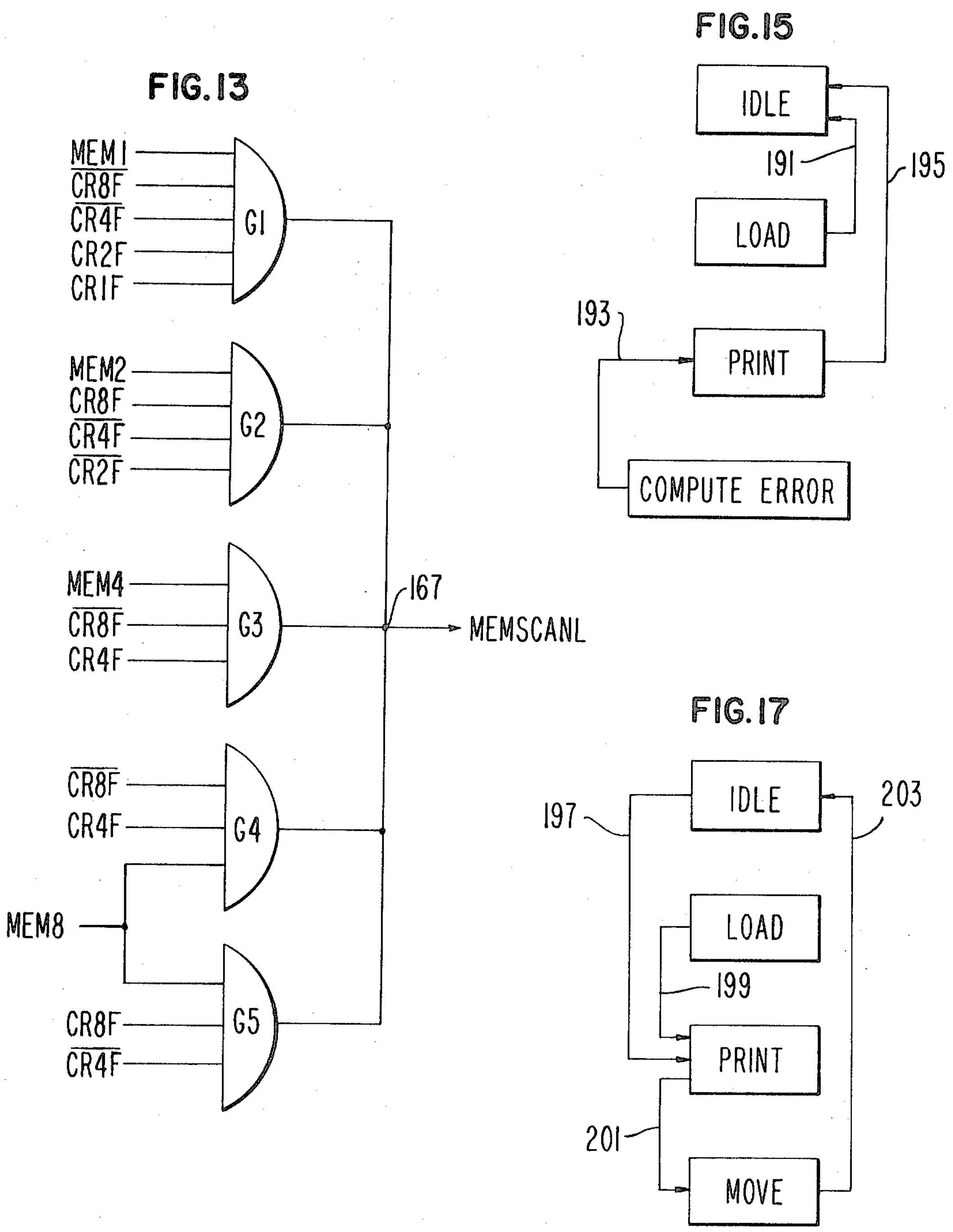
FIG. 13 is a diagram of the memory scan logic.
FIG. 15 is a block diagram for the calculator state sequencing for the clear operation.
FIG. 17 is a block diagram of the calculator state sequencing for total or subtotal operation.

The memory scan logic circuitry, illustrated in FIG. 13, forms the signal MEMSCANL appearing in the logic of the addition or subtraction equations A8 and A7 as shown in FIG. 12. The memory scan logic comprises five AND-gates G1, G2, G3, G4 and G5. The outputs of the AND-gates G1 through G5 are connected to node 167 to provide the logic signal MEMSCANL appearing in the logic of equations A7 and A8.

As previously mentioned, each digit of a word in the memory comprises four flip-flops (MEM1, MEM2, MEM4, MEM8) which represent the binary values 8, 4, 2 and 1, respectively, of a digit accessed by the WR 23 and the DD 17. The AND-gate G1 has the inputs MEM1, $\overline{CR8F}$, $\overline{CR4F}$, CR2F and CR1F and has an output during one clock pulse when the one flip-flop (MEMl) of a digit is set. The AND-gate G2 has the inputs MEM2, CR8F, $\overline{CR4F}$, and $\overline{CR2F}$ and has an output during two clock pulses when the two flip-flop (MEM2) of a digit is set. The AND-gate G3 has the inputs MEM4, $\overline{CR8F}$ and CR4F and has an output during four clock pulses when the four flip-flop (MEM4) of a digit is set. The AND-gate G4 and G5 both have the input MEM8 and have a combined output during eight clock pulses when the eight flip-flop (MEM8) of a digit is set. In addition the AND-gate G4 has the inputs $\overline{CR8F}$ and CR4F while AND-gate G5 has the inputs CR8F and $\overline{CR4F}$.

Figure 14:
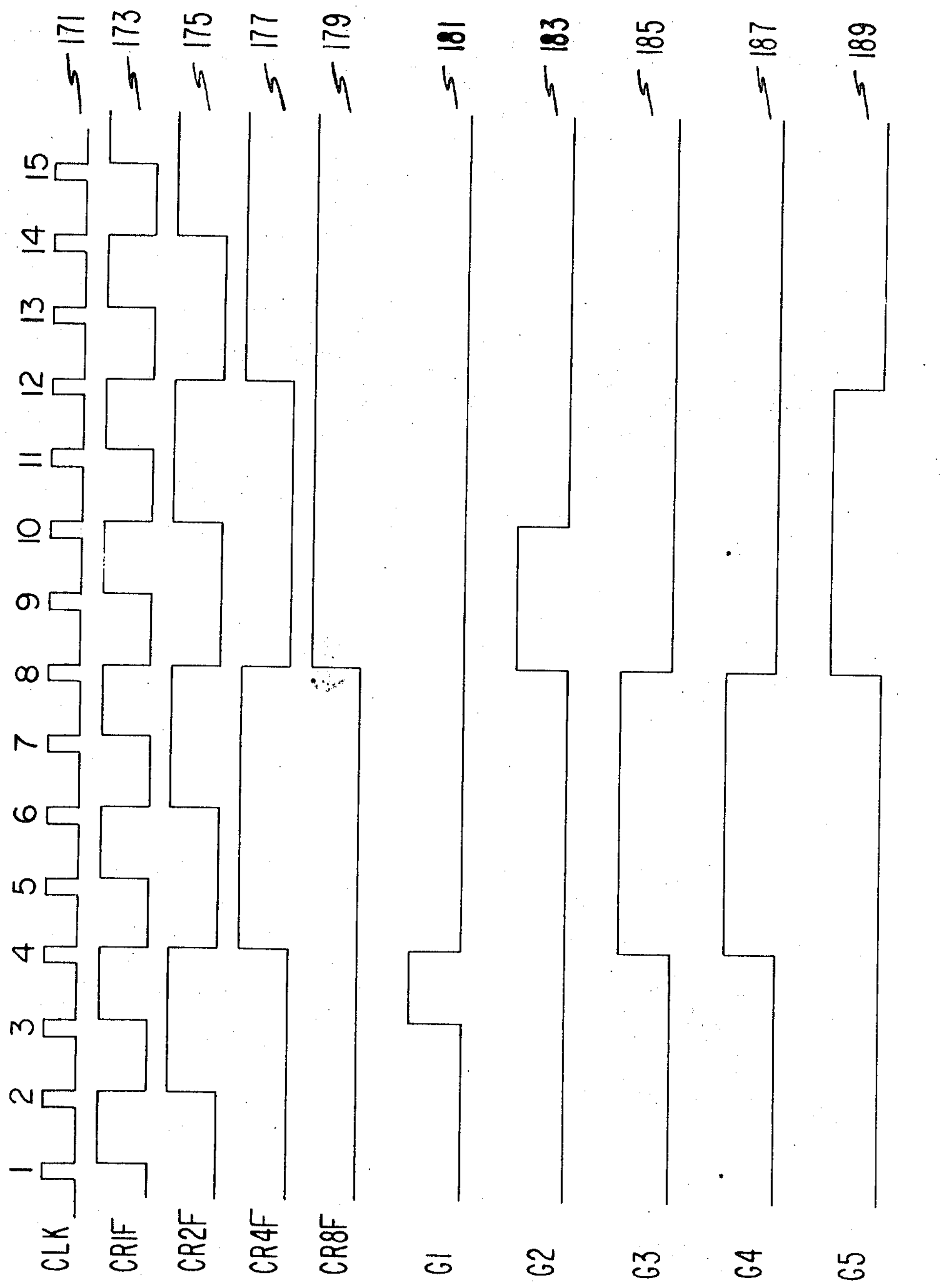
FIG. 14 is a timing diagram for the memory scan logic.

FIG. 14 shows a timing diagram for the memory scan logic of FIG. 13. During the addition or subtraction operation, the SR 41 is in the Add state, the CLKF 45 is set and a train of clock pulses (CLK) 171 is generated by the clock 47. The clock pulses are coupled to the CR 49 comprising flip-flops CR1F, CR2F, CR4F and CR8F and cause the CR 49 to count up from 0 to 15. The pulse trains 173, 175, 177 and 179 show the states of flip-flops CR1F, CR2F, CR4F, and CR8F, respectively, during the 0 to 15 count. In the CR3 count, the condition $\overline{CR8F}$, $\overline{CR4F}$, CR2F and CR1F exists and therefore, as shown by pulse train 181, the gate G1 will have an output of one clock period in duration if MEM1 is set. During the CR=8 and CR=9 counts, the condition CR8F, $\overline{CR4F}$, and $\overline{CR2F}$ exists and therefore, as shown by pulse train 181, the gate G2 will have an output of two clock periods in duration if MEM2 is set. During the CR=4 to CR=7 counts, the condition CR8F and CR4F exists and, as shown by pulse train 185, gate G3 will have an output of four clock periods in duration if MEM4 is set, and similarly, as shown by pulse train 187, gate G4 will have an output of four clock periods in duration if MEM8 is set. During the $CR$=8 to $CR$=11 counts, the condition CR8F and CR4F exists and, as shown in pulse train 189, gate G5 will have an output of four clock periods in duration provided MEM8 is set. Therefore, if MEM8 is set, gates G4 and G5 will have a combined output of eight clock periods in duration covering the period from the $CR$=4 count through the $CR$=11 count.

During the time when the MEMSCANL signal output is present, the add logic of equation A8 will be activated if the other indicated conditions are present and the "AR up" operation will be performed upon occurrence of a clock pulse CLK since, as previously mentioned, the operations performed by the logic are gated with the clock 47 to synchronize the calculator.

If the subtract logic of equation A7 is enabled, then the "AR down" operation will be performed. Therefore, if MEM1 is set the gate G1 will enable the add or subtract logic during the time period $CR$=3 and the AR 35 will step up or down 1 unit. If MEM2 is set gate G2 will enable the add or subtract logic during the time period $CR$=8 to $CR$=9 and the AR 35 will step up or down 2 units. If MEM4 is set gate G3 will enable the add or subtract logic in the time period $CR$=4 to $CR$=7 and the AR 35 will step up or down 4 units. If MEM8 is set gate G4 will enable the add or subtract logic during the time period $CR$=4 to 7 while gate G5 will enable the add or subtract logic during the time period $CR$=8 to $CR$=11 and the AR 35 will step up or down 8 units. Thus the memory scan logic will enable the AR 35 to step up or down a number of times equal to the integer stored in an accessed digit of the memory and thereby add or subtract, respectively, the accessed digit to an integer stored in the AR 35.

Part VI—Clear Operation

The state sequencing of the clear operation is shown in FIG. 15. If a listing exceed capacity error occurs while the calculator is in the Load state, the clear operation sequences the calculator to the Idle state as shown by path 191. If a computing exceed capacity error occurs when the calculator is performing a computation, then the clear operation sequences the calculation to the Print state as shown by path 193, where an "F" is printed and then to the Idle state as shown by path 195. Since in the latter case the error occurred during a computing operation, the computed factor entered in the calculator is incorrect and the printed "F" indicates this condition.

FIG. 16 shows the clear start logic which is part of the logic control unit 21 for performing the clear operation. If a listing exceed capacity (LSTEC) signal occurs in the Load state then the logic of equation CL1 sets control flip-flop ALARMF and resets the CLKF 45. If a computing exceed capacity (COMPEC) error occurs during a computation, then the logic of equation CL2 sets control flip-flop ALARMF, resets the CLKF 45 and sets control flip-flop ECPF, which serves as an exceed capacity print flip-flop. If the control flip-flop ALARMF is set, the alarm light 82 on the keyboard is turned on by the logic of equation CL3 to indicate the error condition to an operator of the calculator.

After the alarm light 82 appears, the operator indexes the clear key 65 and the IR decoder 34 provides the signal CL. If the control flip-flop ECPF is not set, then the logic of equation CL4 sets the Idle state in the SR 41, resets the CLKF 45 and resets the control flip-flop ALARMF. If the SR 41 is in the Load state when the instruction CL is present, then the logic of equation CL5 complements the AKF 29 thereby reversing the logical designation of words K and A. Since the first step of the Load state is to complement the AKF 29, the logic of equation CL5 serves to return the memory 11 to the condition that was present before the listing error occurred in the Load state. If the control flip-flop ECPF is set and the SR 41 is not in the Print state when the clear instruction CL is present, then the logic of equation CL6 sets the Print state in the SR 41, sets the CLKF 45, transfers "0" to the CR 49 and "15" to the DD 17, resets the CYF 37 and sets control flip-flop COMPF. In the Print state an "F" is then printed to indicate that a factor contained in the calculator is in error. When the "End of Pring" signal appears, the logic of equation CL7 sets the Idle state in the SR 41, resets the CLKF 45, resets control flip-flop ALARMF, resets control flip-flop ECPF, and complements the AKF 29 thereby readying the calculator to perform a subsequent operation.

Part VII—Total and Subtotal Operation

FIG. 17 shows the state sequencing of the total and subtotal operation. The operation begins with the calculator in either the Idle state or the Load state. If either the total key 78 or the subtotal key 79 is indexed on the keyboard 31, the calculator sequences from the Idle state by path 197 or from the Load state by path 199 to the Print state. In the Print state, the factor in the accumulator, word B, is printed. From the Print state the calculator sequences to the Move state as shown by path 201 where the factor in word B is moved to word K. If the total key 78 has been indexed word B will be cleared in the Move state, but if the subtotal key 79 has been indexed, word B will not be cleared. From the Move state, the calculator sequences to the Idle state as shown by path 203, and is ready to perform a subsequent operation.

The state sequencing of the total or subtotal operation is controlled by the total or subtotal start logic shown in FIG. 18 which is a part of the logic control unit 21. If the total key 78 or the subtotal key 79 is indexed, the IR decoder 34 will contain the instruction TOT or SUBTOT, respectively, and the logic of equation T1 then operates to set word B in the WR 23, set the Print state in the SR 41, set the CLKF 45, transfer "0" to the CR 49 and "15" to the DD 17, reset the CYF 37, and set the control flip-flop COMPF.

In the Print state the factor in word B is printed and when the print operation is complete an "End of Print" signal is generated. At this point, the logic of equation T2 operates to set the Move state in the SR 41, set the CLKF 45, and transfer "0" to the CR 49 and "0" to the DD 17. In the Move state the contents of word B are transferred to word K and if the total operation is being performed, word B is cleared. However, if the subtotal operation is being performed, the contents of word B are retained undisturbed. At the end of the move operation the signal "End of Move" is generated and the logic of equation T3 operates to set the Idle state in the SR 41 and reset the CLKF 45.

The logic for performing the move operation which is part of the logic control unit 21 is shown in the equations of FIG. 19. Again, as in the listing shift logic previously mentioned, the CRO count, CR1 count, CR2 count and CR3 count are used to step through the move logic. The move logic is enabled by the operation of equation T2 which also turns on the CLKF 45 and causes the clock 47 to count the CR 49 up.

The first cycle begins with $DD$=0 and in the CRO count the logic of equation M1 transfers the integer in digit B0 to the AR 35. In the CR1 count the logic of equation M2 transfers "0" to digit B0 if the total instruction (TOT) is present in the IR decoder 34. However, if the subtotal instruction (SUBTOT) is present, digit B0 is not cleared. Also, in the CR1 count, the logic of equation M3 sets word K in the WR 23.

In the CR2 count the logic of equation M4 transfers "0" to digit KO, thereby clearing KO. In the CR3 count the logic of equation M5 which transfers digit $B_x$ stored in the AR 35 to digit $K_x$ is not enabled in the first cycle since the term $\overline{DD=0}$ appears in the equation. Thus the sign digit B0 is not moved to digit K0. Also in the CR3 count the logic of equation M6 sets word B in the WR 23 and steps the DD 17 up to 1.

Cycle 2 then begins and in the CR0 count digit B1 is transferred to the AR 35. In the CR1 count word K is set in the WR 23 and digit B1 is cleared if the total operation is being performed. In the CR2 count digit K1 is cleared. In the CR3 count the logic of equation M5 transfers digit B1 appearing in the AR 35 to digit K1. Also, the address word B is set in the WR 23 and the DD 17 is stepped up to 2. Thus it can be seen that the move operation comprises the steps of reading digit $B_x$ into the AR 35, clearing digit $B_x$ if a total operation is being performed, clearing digit $K_x$ and writing digit $B_x$ stored in the AR 35 into digit $K_x$.

The Move operation continues in a similar manner, moving digits 2 through 15 in cycles 3 through 16, respectively. In cycle 16 digit B15 is transferred to the AR 35 during the CR0 count. In the CR1 count word K is set in the WR 23 and digit 15 is cleared if the total operation is being performed. In the CR2 count digit K15 is cleared. In the CR3 count digit B15 appearing in the AR 35 is transferred to digit K15 and the logic of equation M7 operates since $DD$=15 and the signal "End of Move" is generated, thereby allowing the logic of equation T3 to sequence the SR 41 to the Idle state.

Thus the move operation transfers digits B1 through B15 to the digits K1 through K15, respectively, and in the case of the total instruction, clears the digits in word B. However, the sign digit B0 is not transferred to digit K0 since the logic of equation M5 does not operate in cycle 1.

Part VIII—Multiplication or Division Operation

Figures 20, 21:
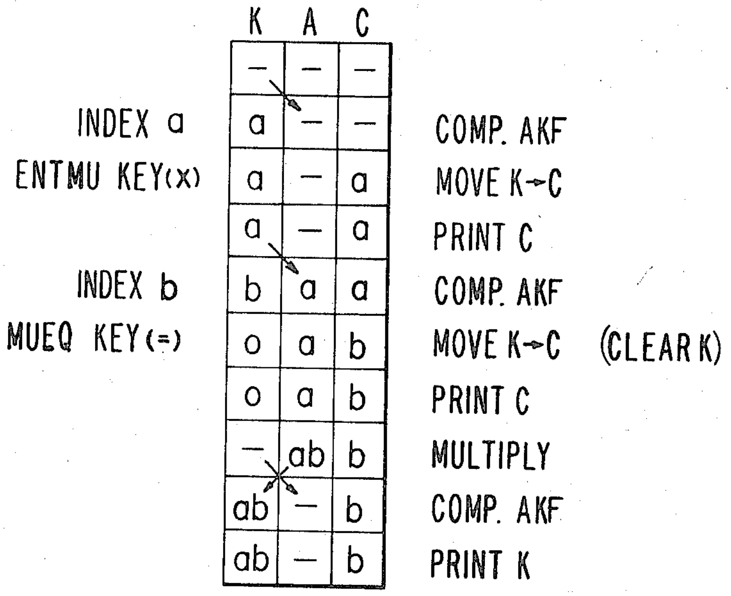
FIG. 20 is a diagram of the multiply operation memory flow.
FIG. 21 is a diagram of a multiply example.

The memory flow during a multiply calculation is shown in FIG. 20, which summarizes the calculation $a\times b=ab$. The first step in a multiply calculation is initiated by indexing the multiplier, factor "*a*" on the keyboard 31. When the first digit of factor "*a*" is listed by the listing operation, previously described, the calculator operates to complement the AKF 29 thereby reversing the logical designation of words K and A. The listing of factor "*a*" continues until factor "*a*" is stored in word K physical location A'. The enter multiply (ENTMU) key 74 is then indexed on the keyboard and in response the calculator reproduces the contents of word K at word C. The contents of word C are then printed and word C cleared thereby entering factor "*a*" on a record medium in the printer 53 (shown in FIG. 24).

The multiplicand, factor "*b*," is then indexed on the keyboard 31. In response to the entering of the first digit, the calculator operates to complement the AKF 29 and factor "*a*,"stored in word K (physical location A') is redesignated word A where it remains. The listing of factor "*b*" continues until factor *b* appears in word K (physical location K'). The multiply equal (MUEQ) key 75 is then indexed and in response the calculator moves factor "*b*" in word K to word C and clears word K with the result that factor "*b*" appears in word C and "0" appears in word K. The calculator then prints the contents of word C thereby recording factor "*b*" but without clearing word C. Next, the multiply operation is performed by the calculator and the product "*ab*" *appears in word A. The AKF 29 is then complemented and the product* "*ab*" *is accessed at word K* (*location A'*). *The calculator then prints the contents of word K and the product* "*ab*" is recorded.

The multiply operation may also be initiated by indexing either the equal add (EQAD) key 71 or the equal subtract (EQSU) key 73 instead of indexing the multiply equal (MUEQ) key 75. In these cases the product appearing in word K is respectively, added to or subtracted from the accumulator, word B, after the multiply operation. Thus, the calculator can also perform the multiply operation and combine the product with the contents of the accumulator.

The multiply operation uses the method of forming partial products by repeated addition and begins with the multiplier stored in word A and the multiplicand in word C. The multiplicand is added to word K a number of times equal to the least significant digit of the multiplier thereby forming the first partial product. A right shift of word K and word A is then performed where the two words are treated as a single register. Thus the least significant digit of the partial product in word K is shifted into word A and the least significant digit of the multiplier in word A is shifted out of word A. The multiplicand is then added to word K a number of times equal to the least significant digit of word A, now containing the second digit of the multiplier, and another right shift is performed. The formation of partial products continues and after 15 shifts, in the illustrated embodiment, the multiply operation is complete with the product appearing entirely in word A. If the product is so large that it overflows into word K then a computing exceed capacity (COMPEC) signal is generated and the alarm condition is set by the logic of equation CL2 shown in FIG. 16.

Refer now to FIG. 21 which illustrates the multiply operation for the example 32×126=4,032. In the example it has been assumed for purposes of simplification that words K, A and C comprise four digits each. However, the manner in which the calculator operates with a greater number of digits will be apparent from the example.

As the multiply operation begins "0000" is stored in word K, the multiplier "0032" is stored in word A and the multiplicand "0126" is stored in word C. Also, the numeral "4" representing the number of digits in a word, is stored in sign digit A0. In step 1 the multiplicand "126" is added to word K and digit A1 is reduced by one. In step 2 the multiplicand "126" is again added to word K and digit A1 is reduced by one. The factor "0030" now appears in word A and the factor "0252" appears in word K. Since digit A1=0 the first partial product is completed. Therefore, in step 3 a right shift is performed and digit A0 is stepped down to 3 to maintain a count of the number of partial products being formed. Thus digit K1 of the partial product is shifted to digit A4 and digit A1 is shifted out of word A. The second digit of the multiplicand, originally digit A2, now appears in digit A1.

The formation of the next partial product now proceeds with the partial product "0025" appearing in word K. Since the integer "3" appears in digit A1, the multiplicand "126" is added to word K three times in steps 4, 5 and 6 with digit A1 being reduced after each addition. At this point, digit A1=0 and therefore, in step 7, a right shaft is performed and digit A0 is stepped down to 2. In step 8 digit A1=0 again and, therefore, a right shift is again performed and digit A0 is stepped down to 1. In step 9 digit A1=0 once more and again a right shift is performed and digit A0 is stepped down to 0. At this point digit A0=0 indicating that the multiplication is complete and the product "4032" appears entirely in word A.

It is apparent that any number of digits may be used. In the illustrated embodiment where the calculator uses 15 digit words, the integer "15" is stored in digit A0 and 11 more right shifts are performed after step 9 thereby reducing digit A0 to zero and completing the calculation.

Refer now to FIG. 22 which shows the memory flow for the calculation $ab=a/b$. The division calculation begins with the indexing of the dividend, factor "*a*," on the keyboard 31. As the first digit of factor "*a*" is listed by the listing operation, previously described, the calculator operates to complement the AKF 29 thereby reversing the logical designations of words K and A. At the completion of the listing operation, factor "*a*" appears in word K (location A'). The enter divide (ENTDV) key 76 is then indexed and the calculator operates to reproduce the contents of word K in word C. The calculator then prints the contents of word C, and clears word C, thereby recording factor "*a*" on a record medium in the printer 53 (shown in FIG. 24).

The divisor, factor "*b*" is then indexed on the keyboard 31. As the first digit of factor "*b*" is listed, the calculator operates to complement the AKF 29 thereby redesignating factor "*a*" in word K (location A') to word A. The listing of factor "*b*" in word K (location K') is then completed. Next, the division operation is initiated by indexing the divide equal (DVEQ) key 77 on the keyboard. In response, the calculator then operates to move the contents of word K to word C and clear word K, with the result that "0" is stored in word K and factor "*b*" is stored in word C. The calculator then prints the contents of word C thereby recording factor "*b*," but does not clear word C. The divide operation is then performed by the calculator and the quotient "*a*/*b*" appears in word A and the remainder "R" appears in word K. The AFK 29 is then complemented and the quotient "*a*/*b*" is redesignated word K and the remainder "R" is designated word A. The calculator then prints the contents of word K thereby recording the quotient "*a*/*b*." The divide operation may be initiated by indexing either the equal add (EQAD) key 71 or the equal subtract (EQSU) key 73 instead of indexing the divide equal (DVEQ) key 77. As in the case of multiplication, the calculator then combines the quotient appearing in word K with the contents of the accumulator, word B.

The division operation is the inverse of the multiplication operation with subtractions being performed to reduce the dividend to an amount less than the divisor and being counted to form the quotient followed by leftward shifts of the dividend. The division begins with the dividend stored in word A and the divisor stored in word C. As in the multiply operation, word K and word A are treated as a single register and when a left shift is performed, the dividend is shifted into word K. The dividend is initially shifted left one place into word K. The divisor is then subtracted from the portion of the dividend in word K a number of times until the dividend is less than the divisor and a left shift is then performed. The number of subtractions is counted and stored in the least significant digit of word A to form the quotient. Again the divisor is subtracted from the dividend until the dividend is less than the divisor and a left shift is performed with the number of subtractions being recorded in the least significant digit of word A. The process continues until, in the illustrated embodiment, 15 shifts have been performed and the quotient appears in word A and the remainder appears in word K.

Refer now to FIG. 23 which illustrates the division operation 67456=12 with remainder 2. In the example it has been assumed for purposes of simplification, as was done in the multiply operation, that words K, A, and C comprise four digits each. However, the manner in which the calculator operates with a greater number of digits will be apparent from the example.

As the division operation begins, "0000" is stored in word K, the dividend "0674" is stored in word A and the divisor "0056" is stored in word C. The digit A0 contains the integer "4" representing the number of digits in a word. In step 1 the divisor "56" is subtracted from word K with a negative value resulting in word K. Therefore, the dividend is less than the divisor and in step 2 the divisor "56" is added back to word K returning word K to its presubtract value. In step 3 words K and A are shifted left one place and digit A0 is stepped down to 3 to maintain a count of the number of the left shifts performed. In steps 4, 5 and 6 a dividend test followed by an add back and a left shift is performed and digit A0 is stepped down to 2. In steps 7, 8 and 9 another dividend test followed by an add back and left shift is performed and digit A0 is stepped down to 1. At this point the value "0067" appears in word K and the dividend is greater than the divisor.

In step 10 the divisor "56" is subtracted from word K leaving the positive value "0011" in word K. Therefore, digit A1 is stepped up one, thereby beginning formation of the quotient. In step 11 the divisor "56" is subtracted from word K and a negative value is obtained indicating that the dividend is less than the divisor. Therefore, in step 12 an add back is performed returning word K to the presubtract value "0011." In step 12 a left shift is performed and digit A0 is stepped down to 0. At this point the value "0114" appears in word K and the value "0010" appears in word A.

In step 14 the divisor "56" is subtracted from word K leaving the positive value "0058" in word K. Therefore, digit A1 is stepped up one and the value "0011" appears in word A. In step 15 another subtraction is performed leaving the positive value "0002" in word K, and digit A1 is stepped up with the value "0012" appearing in word A. In step 16 the subtraction of the divisor "56" results in a negative value in word K. Therefore, an add back is performed in step 17 returning word K to the presubtract value "0002." Since digit A0 equals 0 the division is complete and the quotient "0012" appears in word A and the remainder "0002" appears in word K.

Part IX—Print Operation

FIG. 24 shows a schematic drawing of the printer utilized in the calculator. The printer 53 comprises a drum 205 which rotates about a shaft 207 and has characters arranged in rows and columns on the face thereof. A symbol column S2 and a symbol column S1 contain symbols used to give information concerning a factor to be printed by the calculator. The drum also contains, in one embodiment, 16 numeral columns 209 each having the numerals 0–9 and a decimal point as shown in the drawing, thereby forming a matrix of characters, 10 rows by 18 columns. As is apparent, any desired combination of numeral and symbol columns may be used. The drum is synchronized to print the symbol and numeral equivalents of binary information in the registers of the memory, as known in the art.

A print hammer 211 is located adjacent the drum and includes, as is well known in the art, a solenoid for causing the print hammer to impact a recording medium 213, interposed between the drum 205 and the print hammer 211, against a character on the drum. The print hammer 211 traverses the drum 205 in the direction of the arrow upon engagement of a traverse means (not shown) well known in the art. The print hammer also includes detection means such as a switch which is activated when the print hammer is in the rightmost position to provide a $\overline{\text{READY}}$ signal 215 which is coupled to the print control 55.

A pulse generator 217 is coupled to the shaft 207 and provides an $\overline{\text{ENGAGE}}$ signal 219 to the print control 55 when the characters on the drum approach the print hammer in a position to begin the printing of a line. The pulse generator 217 also provides a row synchronization pulse which is coupled to the AR 35 when each row of characters is aligned with the print hammer 211.

In one embodiment, the pulse generator 217 comprises a wheel coupled to the shaft 207 and having magnetic material in the periphery thereof. As a row of characters is aligned with the print hammer, magnetic material on the wheel passes by a coil and generates a current pulse in the coil to provide a row synchronization pulse.

The row synchronization pulses produced by the generator 217 are coupled to the AR 35 and count the AR up. The output of the AR 35 is coupled to the print control 55. The print control 55 also has inputs from the DD 17 and an accessed digit of the memory 11. The print control 55 provides a CARRIERF signal 221 which causes the print hammer 211 to engage the traverse means and begin moving across the drum 205 in the direction of the arrow. A hammer print pulse (HAMPP) 223 is provided by the print control to operate the print solenoid and cause the print hammer 211 to impact the recording medium 213 against a selected character.

The operation of the printer 53 in printing a line of information will now be described. When the first row of characters begins to approach the print hammer 211, the ENGAGE signal 219 is produced by the generator 217. The print control 55 then produces the CARRIERF signal 221 which causes the print hammer to engage the traverse means and begin to move to the left. As each row of characters passes by the print hammer 211 a row synchronization pulse is produced by the generator 217 and counts the AR 35 up from 0 through 10. The print control 55 examines the count in the AR 35 and when the count indicates that a desired symbol is aligned with the print hammer, a hammer print pulse (HAMPP) is generated and the print hammer 211 impacts the recording medium 213 against the desired character in column S2. The print hammer continues to traverse the drum 205 and is aligned with column S1. Again a symbol is printed in a similar manner.

The print hammer 211 then continues to traverse the drum 205 and is aligned with the first numeral column. As each numeral is aligned with the print hammer a row synchronization pulse is generated and counts the AR up from 0 through 10. When the count in the AR 35 equals the integer in the first digit of a word in the memory 11, the print control 55 generates a hammer print pulse and causes the print hammer to impact the recording medium against a character. The DD 17 is then stepped up to the second digit and the process continues with the printing of subsequent digits and a decimal point as the print hammer 211 continues to traverse the drum. Provision is made in the print control 55 to suppress zeros to the right of the digit DS−R+1 which is set in the format control 81 and to suppress nonsignificant zeros located to the left of the most significant nonzero integer in the factor to be printed.

The print control 55 comprises the print scan logic shown in FIG. 25 and the symbol and number print logic shown in FIG. 26. The operations performed by the print scan logic are synchronized by the clock pulses CLK generated by the clock 47. The print scan logic operates to scan the factor to be printed beginning with the 15th digit and stepping the DD 17 down until the first nonzero digit is observed. The print scan logic then steps the DD 17 up one digit and writes the value "15" in the higher order digit adjacent the most significant nonzero digit. If a nonzero digit has not been encountered and *DD=DS+*then the print scan logic writes the value "15" in digit DS+1. The symbol and number print logic prints a factor beginning with the least significant digit and proceeding to the left. When the logic encounters a digit containing the value "15," the printing stops and the value "15" is cleared thus suppressing the nonsignificant zeros and returning the factor to the preprint condition.

In the symbol and number print logic of FIG. 26, the row synchronization pulses from the generator 217 are utilized to form clock pulses CLK' which are used to synchronize the operation of the calculator instead of the clock pulses CLK generated by the clock 47. The clock pulses CLK' are also used to count the AR 35 up from 0 through 10. In the description, the statement that the AR 35 is the 10th count designates that the four flip-flops in the AR 35 are reset ($AR=0$) and that the CYF 37 is set. The 10th count in the AR 35 is designated in the logic of FIG. 27 by the term ($AR=0$)·CYF. The symbol and number print operation begins with $DD=0$. The print hammer 211 begins to traverse the drum 205 and appears before symbol column S2 which is printed first. When the count in the AR 35 indicates that the desired symbol is aligned with the print hammer 211, a print signal (HAMPP) is developed and the print hammer impacts the recording medium against the desired symbol in column S2. The print hammer continues to traverse the drum and appears before symbol column S1. Again, when the count in the AR 35 indicates that the desired symbol is aligned with the print hammer, a print pulse occurs and symbol S1 is printed. At the end of the printing of symbol S1 on the 10th count of the AR 35 the DD 17 is stepped up to 1.

The print hammer 211 now appears before the first numeral column and $DD=1$. The AR 35 counts up upon application of the row synchronizing pulses and the count in the AR 35 indicates the numeral which is aligned with the print hammer. Thus when the count in the AR 35 equals the integer contained in the accessed digit of the memory, the proper numeral character is aligned and a print pulse is generated. However, provision is made to suppress zeros to the right of the digit DS−R+1 and if this condition exists, no print pulse will be generated.

After the first numeral column is printed, the DD 17 is stepped up to 2 and the print hammer appears before the second numeral column. The numeral columns proceed to be printed until $DD=DS+1$. At this point, the decimal point is printed on the 10th count of the AR 35. After the printing of the decimal point, the DD 17 is not stepped up but remains at $DD=DS+$As the print hammer appears before the next numeral column, the next digit of the factor is printed and the DD 17 is stepped up again.

The printing of subsequent numerals continues until a digit is encountered which contains the value "15." At this point, printing is stopped, and "End of Print" signal is generated and the digit containing the value "15" is cleared. Thus, the factor is returned to the preprint condition and is available for subsequent calculations. If no digit containing the value "15" is encountered in a factor, the printing continues until $DD=15$ and then an "End of Print" signal is generated after the printing of the 15th digit is completed.

FIG. 27 shows a table giving the count in the AR 35 for the alignment of the characters contained on the drum 205. The numerals 0 through 9 are aligned when the count in the AR 35 equals the numeral and are printed by the logic of equation P10. The decimal point is aligned in the 10th count of the AR 35, indicating that the four flip-flops of the AR 35 are reset ($AR=0$) and that the CYF 37 is set, and is printed by the logic of equation P12. Each of the symbols in column S1 and column S2 is aligned when the count in the AR 35 is equal to the value shown in FIG. 27 adjacent the symbol, and the indicated combination of keys indexed and memory state exists.

The symbol decoding logic shown in FIG. 28 inspects the condition of the calculator and when the count of the AR 35 indicates that the desired character for the condition of the calculator is aligned with the print hammer 211, the signal "S2" or "S1" is generated and the logic of equation P5 and P7, respectively, prints symbol column S2 and symbol column S1. Thus, when $AR=0$ and the instruction "AD" are present indicating that an addition operation is to be performed and word K is set in the WR 23, the signal "S1" is produced and the symbol "+" is printed by the logic of equation P7 when the print hammer appears before column S1. The calculator is in this condition when the Print state is set by the logic of equation AS1 shown in FIG. 11.

Inspection of the symbol decoding logic of FIG. 28 for the terms "S1" and "S2" reveals the conditions under which the symbols shown in FIG. 27 will be printed. For example, inspection of the symbol decoding for the term "S2" reveals that the symbol "*x*" is printed in column S2 in the 4th count of the AR 35 when word K is not set in the WR 23 and the term "-MU" exists indicating that either the multiply equal (MUEQ) key 75, the equal add (EQAD) key 71 or the equal subtract (EQSU) key 73 has been indexed. The calculator is in this condition when the contents of word C are printed in the multiply calculation as shown in FIG. 20. It is obvious that any combination of symbols may be used and that additional symbols could be generated if desired.

The print scan logic of FIG. 25 will now be described in detail. The print operation begins with the Print state set in the SR 41, the CLKF 45 set and $DD=15$. The logic of equation PS1 steps the DD 17 down upon occurrence of clock pulse CLK produced by the clock 47 provided that the conditions of equations PS2, PS3 and PS6 do not exist. The DD 17 continues to step down until the logic of PS2 is enabled, indicating that the first nonzero digit has been encountered or until the logic of equation PS3 is enabled indicating that $DD=DS+1$. If a nonzero digit is encountered, the logic of equation PS2 steps the DD 17 up, transfers "15" to the AR 35, and sets control flip-flop TBF. However, if $DD=DS+1$ before a nonzero digit is encountered the logic of equation PS3 transfers "15" to the AR 35 and sets control flip-flop TBF. Note that when the logic of equation PS2 or PS3 is enabled, the logic of equation PS1 is disabled and the DD 17 is not stepped down.

If a nonzero digit is encountered before $DD=DS+1$, the logic of equation PS4 then transfers the value "15" stored in the AR 35 to the accessed higher order digit adjacent the most significant nonzero digit. However, if the logic of equation PS3 is enabled, indicating that $DD=DS+1$ before a nonzero digit is encountered, then the value "15" is transferred to the digit DS+1 by the logic of equation PS4. The logic of equation PS5 also operates since the condition TBF exists to set the control flip-flop DPF. The logic of equation PS1 then proceeds to step the DD 17 down until $DD=0$. Upon the occurrence of the first clock pulse CLK after $DD=0$, the logic of equation PS6 operates to reset the CLKF 45, to transfer "0" to the AR 35 and to transfer "0" to the DD 17.

If the print hammer 211 is in its rightmost position, the signal $\overline{\text{READY}}$ is present, and when the pulse generator 217 produces the signal ENGAGE, indicating that the first row of characters is approaching alignment with the print hammer, the logic of equation PS7 sets control flip-flop CARRIERF causing the print hammer to engage the traverse means. The logic of equation PS8 resets control flip-flop CARRIERF when the Print state is exited and the condition $\overline{\text{PRINT}}$ exists.

The symbol and number print logic shown in FIG. 26 now operates to print a factor. In the symbol and number print logic, the CLFK 45 is initially in the reset condition, and no clock pulses CLK are being generated by the clock 47. However, the row synchronization pulses produced by the pulse generator 217 enable the logic of equation P1 to produce the clock pulses CLK' when the control flip-flop CARRIERF is set and the condition READY is present, indicating that the print hammer has begun to traverse the drum 205. The clock pulses CLK' are gated with all the logic operations performed by the symbol and number print logic, except the hammer print pulse (HAMPP) operation, to synchronize the calculator in the same manner as the clock pulses CLK are used to synchronize the logic operations of the logic control unit 21 as previously mentioned.

The logic of equation P2 operates to step the AR 35 up upon the occurrence of each clock pulse CLK', provided the CYF 37 is reset. Thus, the AR 35 counts from 0 to 10 as the row synchronization pulses operate the logic of equation P1 to produce the clock pulses CLK'. When the AR 35 receives the 10th clock pulse CLK' the CYF 37 is set and when the next clock pulse CLK′ is generated, indicating that the print hammer is before the next column, the logic of equation P3 resets the CYF 37 causing the AR 35 to assume the 0 count.

The symbol and number print logic begins with $DD=0$ and first prints symbol column S2. As the AR 35 is counted up by the logic of equation P2, the term "S2" produces a signal when the desired symbol in column S2 is aligned with the print hammer 211. The symbol decoding logic for term "S2" is shown in FIG. 28. Thus, during the 0 to 9 count of the AR 35, when the proper character is aligned and the clock pulse CLK′ is received, the logic of equation P5 operates to produce a hammer print pulse (HAMPP) which operates the print hammer solenoid thereby causing the print hammer 211 to impact the recording medium 213 against the selected character in column S2 on the drum 205. The logic of equation P6 operates in the 10th count of the AR 35 when the CYF 37 is set to reset control flip-flop TBF. Since equation P6 is enabled, the logic of equation P4 is disabled and the DD 17 is not stepped up but remains at $DD=0$.

The symbol column S1 is next printed in a manner similar to the printing of symbol column S2. The term "S1" in the logic of equation P7 provides a signal when the desired symbol in column S1 is aligned with the print hammer. FIG. 28 shows the symbol decoding logic for generating the term "S1." During the 0 to 9 count of the AR 35, when the desired character is aligned with the print hammer 211 and clock pulse CLK′ is received, the logic of equation P7 operates to generate a hammer print pulse (HAMPP) thereby printing symbol S1. In the 10th count of the AR 35, the CYF 37 is set and the logic of equation P8 operates to set control flip-flop TBF. Also, in the 10th count of the AR 35 the logic of equation P4 steps the DD 17 up to 1.

The logic of equation P9 operates to reset the control flip-flop DPF if either $DD=DS-R+1$ or an accessed digit of the memory, other than the sign digit, is nonzero. As will become apparent, this enables the symbol and number print logic to suppress zeros to the right of the location $DD=DS-R+1$ contained in the format control 81.

The numerals of the factor in the accessed word are now printed by the logic of equation P10. As the rows of characters on the drum 205 become aligned with the print hammer 211, the logic of equation P2 counts the AR 35 up from 0 through 10 as the row synchronization pulses produced by the generator 217 from the clock pulses CLK′. When the integer in the $DD=1$ digit in the memory equals the count in the AR 35 ($MEM=AR$) and the clock pulse CLK′ is received, the logic of equation P10 operates to produce a hammer print pulse (HAMPP), thereby printing the first digit.

The logic of P10 is disabled if the condition TBF. ($DD=DS+1$) exists indicating that a decimal point is to be printed. Also, the condition [$\overline{DPF+(DD=DS-R+1)}$] disables the logic of equation P10 in order to suppress zeros to the right of the digit $DD=DS-bhz1$. If a nonzero integer appears in a digit to the right of $DD=DS-r+1$, the logic of equation P9 resets control flip-flop DPF, thereby enabling the logic of equation P10 to print the nonzero integer. If digit $DD=DS-R+1$ is reached before a nonzero integer is encountered, the logic of equation P10 is enabled to allow printing of the $DD=DS-DS+1$ digit while the logic of equation P9 resets the control flip-flop DPF, thereby enabling the logic of equation P10 to print subsequent digits.

After each digit of a factor is printed, the logic of equation P4 operates in the 10th count of the AR 35 when the CYF 37 is set to step the DD 17 up. As the print hammer continues to traverse the drum and subsequent digits are printed, the $DS+1$ digit is reached. At this point the numeral print logic equation P10 is disabled and in the 10th count of the AR 35, the logic of equation P11 operates to reset control flip-flop TBF while the logic of equation P12 produces a hammer print pulse (HAMPP) to print the decimal point. Since the logic of equation P11 is operated, the logic of equation P4 is disabled and the DD 17 is not stepped up in the decimal point print cycle but remains at digit $DD=DS+1$. As the print hammer moves to the next numeral column, the numerals continue to be printed by the logic of equation P10 and then the DD 17 is stepped up by the logic of equation P4.

As subsequent columns are printed, if the value "15," which was set by the print scan logic, is encountered in an accessed digit of the memory, the logic of equation P13 operates and resets the control flip-flop COMPF thereby disabling the numeral print logic of equation P10. The logic of equation P14 then operates to generate the signal "End of Print", to transfer "0" to the DD 17 and to transfer "0" to the accessed digit of the memory. Thus, the value "15" which was written in the print scan logic is cleared and the printed factor is restored to the preprint condition for subsequent use. If the most significant digit of a factor, digit 15, contains a nonzero integer, then the numerals continue to be printed until $DD=15$. At this point, the AR 35 is counted up from 0 to 9 by the clock pulses CLK′ with digit 15 being printed when the proper numeral is aligned. The AR 35 is then counted up to the 10th count thereby setting the CYF 37, and the logic of equation P15 operates to generate the signal "End of Print," to transfer "0" to the DD 17 and to reset control flip-flop COMPF.

Recall that in the clear operation (shown in FIG. 16), if a computing error is encountered, the logic of equation CL6 sets the Print state in the SR 41 when the clear key 65 is indexed. After the Print state is set, the symbol and numeral print logic causes an "F" to be recorded in symbol column S2 by the printer 53. The symbol decoding shown in FIG. 28 for the term "S2" produces a signal in the 9th count of the AR 35 if the clear instruction (CL) exists, and this signal enables the logic of equation P5 and produces a hammer print pulse (HAMPP) thereby printing an "F" in column S2. All the remaining logic equations (P7, P10 and P12) which could operate to produce a hammer print pulse are disabled by the clear instruction (CL) and therefore no further printing occurs. An "End of Print" signal is then generated by the logic of equation P14 or P15, indicating completion of the print operation, and then the Idle state is set in the SR 41 by the logic of equation CL7.

We claim:

1. An electronic calculator comprising:
   - a memory having an entry register, an auxiliary register and an accumulator register,
   - means for receiving and temporarily storing data representing numerical factors and logical instructions,
   - a single multifunctional arithmetic register means for transferring factors from said receiving and storing means to said memory, for transferring a factor from one of said registers to another of said registers, and for storing a factor and increasing it algebraically in computing operations, and
   - logic means for controlling the operations of said memory and said arithmetic register means.

2. The calculator of claim 1 wherein said arithmetic register means includes carry means.

3. The calculator of claim 2 wherein said arithmetic register means includes a scale-of-ten up-down counter and said carry means is a bistable device.

4. The calculator of claim 3 including arithmetic register control means for controlling the operation of said up-down counter, said arithmetic register control means including memory scan logic means for determining the count to be made by said up-down counter in said computing operations.

5. The calculator of claim 1 including:
   - register access means for accessing a selected one of said memory registers, and
   - digit address means for stepping from one digit position to another in said selected one of said memory registers, both said register access means and said digit address means being controlled by said logic means.

6. The calculator of claim 5 wherein said digit address means includes an up-down counter, said counter being settable at the proper count for specific arithmetic computations by said logic means.

7. The calculator of claim 6 further including a source of clock pulses, said logic means operating in synchronization with said clock pulses.

8. The calculator of claim 7 wherein said entry register includes a first and a second individually accessible multidigit word location, each having its own logic designation and wherein said register access means includes word register means for accessing a selected one of said first word location, said second word location, said accumulator register, and said auxiliary register.

9. The calculator of claim 8 wherein said register access means further includes means responsive to said logic means for transposing the logic designation of said first and second word locations of said entry register to facilitate computations without physically moving a word from one of said word locations to the other.

10. The calculator of claim 9 wherein said logic means further includes means for concurrently operating the first and second word locations of said entry register as a single continuous recirculating shift register for shifting factors right and left in multiplication and division operations, respectively.

11. The calculator of claim 1 wherein said entry register includes two individually accessible multidigit word locations, each having its own logic designation.

12. The calculator of claim 11 including means controlled by said logic means for transposing the logic designations of said two individually accessible multidigit word locations of said entry register to facilitate computations without physically moving a word from one of said multidigit word locations to the other.

13. The calculator of claim 12 wherein said two individually accessible multidigit word locations of said entry register include means for permitting concurrent utilization of said two word locations as a single continuous shift register for shifting factors right and left in multiplication and division operations, respectively.

14. The calculator of claim 13 including a decimal input keyboard for entering data representing numerical factors and logical instructions seriatim into said receiving and storing means.

15. The calculator of claim 14 wherein said keyboard includes means for automatically encoding said data representing numerical factors and logical instructions in binary form and wherein said receiving and storing means includes means for interpreting said data and for transferring said coded logical instructions to said logic means.

16. The calculator of claim 15 including means for automatically positioning the decimal point at a physical location in the selected word location of said entry register and for rounding off an entry in said location with respect to said decimal location.

17. The calculator of claim 16 wherein said keyboard includes settable means for controlling the said position of the decimal point and the number of decimal places to be retained in said entry.

18. The calculator of claim 17 including means for printing the contents of a selected register of said memory under the control of said logic means.

19. The calculator of claim 18 wherein said printing means includes a drum printer and print control means, and wherein said arithmetic register means counts for said printing control means for synchronizing the characters printed by said printing means with data stored in said selected register of said memory.

20. The calculator of claim 19 wherein said print control means steps said digit address means from one digit address to another in said selected register during a printing operation.

21. In an electronic digital calculator having a memory including a first multidigit word location and a second multidigit word location, an arithmetic circuit for performing addition and subtraction comprising:

an arithmetic register coupled to said first word location for receiving and temporarily storing a binary-coded decimal digit from a given digit position thereof, said register being arranged as an up-down counter;

means for generating a subtraction command and an addition command;

means coupled to said second word location for stepping said arithmetic register up a number of times equal to the value stored in a corresponding digit position in said second word location in response to said addition command, and means coupled to said second word location for stepping said arithmetic register down a number of times equal to the value stored in a corresponding digit position in said second word location in response to said subtraction command.

22. The calculator of claim 21 wherein said register comprises four binary storage elements and includes means for generating a carry signal.

23. The calculator of claim 21 wherein said register comprises four binary storage elements coupled to form a scale-of-ten up-down counter and means for generating a carry signal.

24. An arithmetic circuit for performing addition and subtraction comprising:

a memory having a first multidigit word location for storing a first multidigit factor and a second multidigit word location for storing a second multidigit factor, each digit of said factor being represented in binary coded decimal form, an arithmetic register, coupled to said memory, for receiving a given-order binary coded decimal digit of said first factor, said arithmetic register being arranged as an up-down scale-of-ten counter, means for selectively generating an addition instruction and a subtraction instruction, means for stepping said register up in response to said addition instruction and for stepping said register down in response to said subtraction instruction, and means coupled to said memory for generating an enabling signal for enabling said stepping means to step said register a number of times equal to the value of a corresponding given-order digit of said second multidigit factor.

25. The arithmetic circuit of claim 24 wherein said register includes four bistable storage elements and means for generating a carry signal.

26. The arithmetic circuit of claim 24 further including:

means for generating regularly timed pulses, the operation of said stepping means being synchronized to said timed pulses.

27. The arithmetic circuit of claim 26 wherein said means for generating an enabling signal comprises:

a four stage binary up-counter coupled to said means for generating timed pulses to count up upon occurrence of said timed pulses, and gating means coupled to said up-counter and to said second multidigit word location of said memory for producing said enabling signal during a number of timed pulses equal to the binary coded decimal value stored in said corresponding given-order digit position of said second multidigit word location.

28. An addressing system responsive to a word-change command for an electronic digital calculator having an addressable memory, said memory having at least a first word location and a second word location comprising:

word register means for storing a first logical designation and a second logical designation indicative of the respective word locations in said memory to be addressed, a bistable element having a first state and a second state, said element changing from one state to another state in response to said word-change command, and gating means coupled to said word register means and said bistable element for addressing said word locations in said memory, said gating means addressing the first word location in said memory in response to said first designation and the second word location in said memory in response to said second designation when the bistable element assumes said first state and said gating means addressing the first word in the memory in response to said second designation and said second word in said memory in response to said first designation when the bistable element assumes said second state.

29. A method of performing addition in an electronic digital calculator, said method comprising the steps of:
providing a first multidigit word location, a second multidigit word location, and a single arithmetic unit having carry means,
storing a multidigit augend in said first multidigit word location,
storing a multidigit addend in said second multidigit word location,
accessing the least significant digit of said augend in said first word location,
transferring said accessed digit to said arithmetic unit,
scanning a corresponding digit position in said second word location,
stepping up the count in said arithmetic unit a number of times equal to the value of the scanned digit,
transferring the resultant count in said arithmetic unit back to the accessed digit position of said first word location,
accessing the next higher digit of the augend in said first word location and repeating the above-listed steps of transferring, scanning, stepping, transferring-back and accessing until each of the digit positions in said first word location has been processed.

30. The method of claim 29 further including the steps of increasing the value stored in said arithmetic unit by one count whenever a carry has been generated in the stepping-up operation of the cycle involving the previously accessed digit.

31. A method of performing multiplication by forming partial products by repetitive addition in an electronic digital calculator, said method comprising the steps of:
providing a left and a right multidigit word location operable as a single continuous multidigit shift register, and an auxiliary multidigit word location,
storing a binary-coded-decimal multiplicand in said auxiliary multidigit word location and a binary-coded-decimal multiplier in said right multidigit word location,
adding said multiplicand to the contents of said left multidigit word location a number of times equal to the least significant digit of said multiplier,
shifting the contents of said single continuous shift register one digit location to the right, and
repeating said adding and shifting steps until the number of rightward shifts is equal to the number of digit locations in said right multidigit word location.

32. The method of claim 31 wherein said adding step includes the steps of:
accessing the least significant digit of said right multidigit word location,
adding said multiplicand to said left multidigit word location,
reducing the value of said accessed least significant digit by one, and
repeating said adding and reducing steps until said accessed least significant digit is equal to zero,
and wherein said shifting step includes the steps of:
initially storing a value equal to the number of digit locations in said right multidigit word location,
shifting the contents of said single continuous shift register one digit location to the right when the indexed least significant digit is zero, and
reducing said stored value by one each time a rightward shift occurs until said stored value is equal to zero.

33. An electronic digital calculator for performing multiplication by forming partial products by repetitive addition comprising:
a memory including a left and a right multidigit word location operable as a single continuous multidigit shift register, and an auxiliary multidigit word location,
input means for entering a multiplicand in said auxiliary multidigit word location and a multiplier in the right multidigit word location of said single continuous shift register,
accessing means for selecting a given one of said word locations and for stepping from one given digit address to another in said selected word location, said accessing means initially accessing the lowest order digit address in said right word location,
arithmetic means for adding said multiplicand to the contents of said left word location a number of times equal to the value stored in said accessed digit address, and
logic means cooperating with said accessing means and said arithmetic means, said logic means being:
responsive to an addition of said multiplicand to the contents of said left word location for reducing the value stored in said accessed digit address by one until said stored value is equal to zero,
responsive to said stored values being equal to zero for shifting the entire contents of said single continuous shift register one digit location to the right, and responsive to the number of rightward shifts being equal to the number of digit addressing in "said right multidigit word" location for terminating the multiplication operation.

34. The electronic digital calculator of claim 33 wherein said accessing means includes means responsive to said logic means for transposing the logical designations of said left and right multidigit word locations to accomplish a logical transfer without physically transferring the contents of one of said word locations to the other of said word locations.

35.

36. The electronic digital calculator of claim 35 wherein said arithmetic means includes a single multifunctional arithmetic register cooperating with said logic means for receiving and temporarily storing decimal numbers during a transfer from said keyboard means to a selected word location, for receiving and temporarily storing a numerical value from a selected digit address of a selected word location during transfers between digit address locations, for algebraically increasing said stored numerical value a number of times equal to the value stored in a subsequently accessed digit address in another of said word locations, and for performing carry operations in cooperation with said algebraic counting function.

37. An electronic calculator for performing a division operation comprising:
a memory having left, right and auxiliary individually accessible multidigit word locations, said left and right individually accessible multidigit word location being operable as a single continuous recirculating shift register,
input means for entering a dividend in said right word location, and for entering a divisor in said auxiliary word location, and
logic means for sequentially subtracting the divisor from the contents of the left word location until the difference remaining in the left word location is algebraically less than the divisor, for adding back the divisor to the contents of the left word location and shifting the entire contents of said continuous shift register one digit location to the left, for algebraically summing the number of subtractions performed and the single addition back and storing the algebraic sum in the least significant digit position of said right word location, and for repeating said subtracting, adding back, shifting, algebraic summing, and storing operations until the number of leftward shifts is equal to the number of digit positions in said right word location, the quotient being stored in the right word location and the remainder being stored in the left word location, said logic means including a multifunction arithmetic register arranged as an up/down scale-of-ten counter for temporarily storing a numerical value during a transfer from said input means to said memory, for temporarily storing a numerical value during a transfer between said memory locations, and for storing a numerical value and counting it up in response to an addition command and for counting it down in response to a subtraction command, said commands being controlled by said logic means.

38. An electronic digital calculator for performing multiplication using the method of forming partial products by repetitive addition comprising:

a memory including a single continuous recirculating shift register having a right portion forming a first individually accessible multidigit word location and a left portion forming a second individually accessible multidigit word location, said memory also including a third multidigit word location, means for entering a binary-coded-decimal multiplicand in said third word location and for entering a binary-coded-decimal multiplier in said first word location, means for cyclically adding the contents of said third multidigit word location to the contents of said second multidigit word location, means responsive to each addition of the contents of said third word location to the contents of said second word location for reducing the value currently stored in the least significant digit position of said first word location by a factor to one, means responsive to the value stored in the least significant digit position of said first word location for enabling said cyclically adding means to recycle until the value stored in said least significant digit position in said first word location is equal to zero, means responsive to the value stored in said least significant digit position of said first word location being equal to zero for shifting the contents of said single continuous recirculating shift register one digit position to the right and for counting the number of rightward shifts performed, and means responsive to a rightward shift for reenabling said cyclical means until the number of rightward shifts performed is equal to the number of digit positions in said first word location.

39, The electronic digital calculator of claim 38 further including means for selecting a given one of said word location and means for selecting a given digit position in said selected word location, and wherein said cyclic adding means includes:

an arithmetic register arranged as an up/down scale-of-ten counter, said arithmetic register including means for generating a carry signal.

means for transferring the contents of a selected digit position of said second word location to said arithmetic register, means for scanning the value stored in a corresponding digit position of said third word location, means responsive to said scanning for stepping said arithmetic register up a number of counts equal to the value stored in the corresponding selected digit position of said third word location, means for transferring-back the stepped-up result of this addition from said arithmetic register to the selected digit position of said second multidigit word location, and means for enabling the repetition of said transferring, scanning, stepping, and transferring-back functions until the contents of said third multidigit word location have bee added to the contents of said second multidigit word location.

40. In an electronic digital calculator having a multidigit word location for storing a decimal number and keyboard entry means for selectively entering decimal numbers and instructional symbols including a decimal point, a decimal point location system comprising:

means for preselecting the number of digit locations "DS" to the right of the decimal point in said multidigit word location, means for preselecting the number of digit locations "R" to be retained to the right of the decimal point in said multidigit word location, means responsive to the entry of a decimal point in said keyboard entry means for generating a decimal-point-entered signal, switching means for generating an automatic set signal indicating that a decimal point is to be automatically entered into said word location, an positioning means: responsive to the concurrent entry of a digit of a decimal number into said keyboard entry means, the absence of said automatic set signal and the absence of said decimal-point-entered signal for shifting the stored contents of said multidigit word location one digit address to the left, for addressing a digit address DS plus 1 in said multidigit word location, and for writing said entered digit therein, responsive to the concurrent entry of a digit of a decimal number into said keyboard entry means, the presence of said automatic set signal, and the absence of said decimal-point-entered signal for shifting the stored contents of said multidigit word location one digit address to the left, for addressing a digit address DS minus R plus 1 in said multidigit word location and for writing said entered digit therein, responsive to the concurrent entry of a digit of a decimal number into said keyboard entry means, the absence of said automatic set signal, and the presence of said decimal-point-entered signal for addressing the next rightward digit address in said multidigit word location and for writing said entered digit therein, and responsive to the concurrent entry of a digit of a decimal number into said keyboard entry means, the presence of said automatic sent signal, and the presence of said decimal-point-entered signal for shifting the stored contents of said multidigit word location a number of digit addresses to the left equal to R, the termination of said shifting operation resulting in the addressing of the DS plus 1 digit address in said multidigit word location, for addressing the next rightward digit address in said multidigit word location, and for writing said entered digit therein.

41. In an electronic calculating apparatus having an addressable memory, said memory having first and second word locations with first and second address designations, respectively, an addressing system comprising:

means for generating a word change command, and means responsive to said word change command for reversing the address designations on said first and second word locations and effecting a logical transfer of information between said word locations without the necessity of an actual physical transfer of stored information.

42. An electronic digital calculator having an automatic decimal point alignment system comprising:

a memory having a word location for storing a multidigit number, said word location having a plurality of digit addresses, input means for receiving a digit of said multidigit decimal number means responsive to the receipt of a digit of said multidigit decimal number by said input means for shifting the contents of said word location one digit to the left, and means responsive to said shift for writing said received digit into said word loCation at the digit address corresponding to the number of digit positions to the right of a preselected decimal point location in said word location minus the number of predetermined digits to be retained to the right of the decimal point plus one.

* * * * *

UNITED STATES PATENT OFFICE
CERTIFICATE OF CORRECTION

Patent No. 3,643,077 Dated February 15, 1972

Inventor(s) John O. Griggs, Jr., Arthur J. Radcliffe, Michael F. Matouka

It is certified that error appears in the above-identified patent and that said Letters Patent are hereby corrected as shown below:

Column 4, line 58, "digit" should be --dial--. Column 6, line 16, "assume" should be --assumed--; and line 27, "condition" should be --conditions--. Column 7, line 41, "CRIF" should be --CR1F--; and line 48, "shift" should be --Shift--. Columns 7 and 8, Table I, in the three states labelled "Cycle 16" delete entirely the dashed lines leading from "AR = 0" (both occurrences); "IR < 10 + DZ";"AR ≠ 0"; "IR = DP" and in the column headed "CR count" the dashed lines under "3" (both occurrences); and in Cycle 16 AR ≠ 0, second line "Cear" should be --Clear--. Column 9, line 14, change the comma (,) to a period (.); line 58, "AR 0" should be --AR ≠ 0--; and line 72, "AR 0" should be --AR ≠ 0--. Column 10, line 34, "has" should be --had--; and line 51, after "word-line" insert --logic--. Column 11, line 1, delete exclamation point (!) after "OR". Column 12, line 1, "the" should be --that--; line 47, "and" between "A12" "A13" should be --or--; and after "A13" insert a comma (,); line 48, before "does not operate" insert --respectively, and a subtraction computation will be performed. However, if an addition instruction has been indexed and the factor in word B is positive or if a subtraction instruction has been indexed and the factor word B is negative, the logic of equations A12 and A13--; line 49, "(COMPF)" should be --($\overline{COMPF}$)--; line 51 "Cr4F" should be --CR4F--; line 51, "Bo" should be --BO--; line 63 "·$\overline{CR1F}$)" should be --·CR1F)--; line 67, "to carry" should be --no carry--. Column 13, line 52 "referred to" should be --known as--; and line 53, "15the" should be --15th--. Column 14, line 5, "35" should be --AR 35--; line 8, "15the" should be --15th--; line 38, "AND-gate" should be --AND-gates--; line 60, "CR8F" should be --$\overline{CR8F}$--; and line 66, "CR4F" should be --$\overline{CR4F}$--.

UNITED STATES PATENT OFFICE

CERTIFICATE OF CORRECTION

Patent No. 3,643,077 Dated February 15, 1972

Inventor(s) John O. Griggs, Jr., Arthur J. Radcliffe, Michael F. Matouka

It is certified that error appears in the above-identified patent and that said Letters Patent are hereby corrected as shown below:

Column 15, line 11, "to 7" should be --to CR = 7--; line 64, "Pring" should be --Print--; and line 78, after "state" insert a comma (,). Column 16, line 1, after "201" insert a comma (,); line 5, after "state" insert a comma (,): line 42, after "Also" delete the comma (,); and lines 55 and 56, after "B1" and "AR 35" insert a comma (,). Column 17, lines 29-32, should not be in italics. Column 18, line 12, "shaft" should be --shift--; line 26, "ab = a/b" should be --a ÷ b = a/b--; and line 52, "AFK 29" should be --AKF 29--. Column 19, line 7, "67456 = 12" should be --674 ÷ 56 = 12--. Column 20, line 71, "DD = DS +" should be --DD = DS + 1--. Column 21, line 41, "DD = DS + As" should be --DD = DS + 1. As--. Column 23, line 51, "TBF.(DD =" should be --TBF·(DD=--; line 52, [DPF + (DD = DS - R + 1)] should be --[DPF + (DD = DS - R + 1)]--; line 54, "DD = DS - bhzl" should be --DD = DS - R + 1--; line 56, "DD = DS - r + 1" should be --DD = DS - R + 1--; and line 60, "DD = DS - DS + 1" should be --DD = DS - R + 1--. Column 28, line 36, omitted claim 35 should read:

35. The electronic digital calculator of claim 34 wherein said input means includes non-denomination keyboard means for manually selecting numerical values.--.

Column 29, line 30, "factor to one" should be --factor of one--; line 47, "39," should be --39.--; and line 69, "bee" should be --been--.

Column 30, line 8, "point in" should be --point on--; line 13, "an" should be --and--; line 38, "sent" should be --set--; line 60, after "multidigit" insert --decimal--; line 64, after "number" insert a comma (,); line 67, after "digit" insert --address-; and line 69, "loCation" should be --location--.

Signed and sealed this 22nd day of August 1972.

(SEAL)
Attest:

EDWARD M.FLETCHER,JR.
Attesting Officer

ROBERT GOTTSCHALK
Commissioner of Patents

USCOMM-DC 60376-P69
U.S. GOVERNMENT PRINTING OFFICE : 1969 O—366-334